United States Patent
Nguyen et al.

(10) Patent No.: US 12,360,320 B2
(45) Date of Patent: Jul. 15, 2025

(54) FIBER OPTIC CONNECTOR

(71) Applicant: Senko Advanced Components, Inc., Marlborough, MA (US)

(72) Inventors: Hiep Nguyen, Fort Mill, SC (US); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 309 days.

(21) Appl. No.: 17/929,362

(22) Filed: Sep. 2, 2022

(65) Prior Publication Data

US 2023/0074747 A1 Mar. 9, 2023

Related U.S. Application Data

(60) Provisional application No. 63/252,486, filed on Oct. 5, 2021, provisional application No. 63/242,286, filed on Sep. 9, 2021.

(51) Int. Cl.
*G02B 6/38* (2006.01)
*G02B 6/42* (2006.01)

(52) U.S. Cl.
CPC .... *G02B 6/3849* (2013.01); *G02B 2006/4297* (2013.01)

(58) Field of Classification Search
CPC ...... G02B 6/38; G02B 6/3849; G02B 6/3893; G02B 6/3821; G02B 6/3831; G02B 6/3873; G02B 6/38875; G02B 2006/4297; G02B 6/03
See application file for complete search history.

(56) References Cited

U.S. PATENT DOCUMENTS

| | | | | |
|---|---|---|---|---|
| 4,913,514 A | * | 4/1990 | Then | G02B 6/383 385/60 |
| 5,883,995 A | * | 3/1999 | Lu | G02B 6/3825 385/75 |
| 6,688,780 B2 | * | 2/2004 | Duran | G02B 6/3825 385/76 |

(Continued)

FOREIGN PATENT DOCUMENTS

| | | | |
|---|---|---|---|
| JP | 2009168910 A | * 7/2009 | |
| WO | WO-2004031823 A1 | * 4/2004 | G02B 6/241 |

OTHER PUBLICATIONS

English Translation of JP-2009168910-A (Year: 2009).*

*Primary Examiner* — Michelle R Connelly
*Assistant Examiner* — Darby M. Thomason

(57) ABSTRACT

An optical fiber connector with a connector housing that holds a ferrule includes a retractable shutter having a shutter plate and a shutter actuator. The shutter actuator is slidably connected to the connector housing for movement relative to the connector housing between a front position and a rear position. The shutter actuator is configured to engage the mating interface as the optical fiber connector is plugged into the mating interface whereby the shutter actuator moves relative to the connector housing from the front position to the back position. The shutter plate is connected to the shutter actuator such that the shutter actuator is configured to drive the shutter plate to move between an extended position and a retracted position. In the extended position, the shutter plate is located to shield the ferrule. In the retracted position, the shutter plate is located expose the ferrule.

16 Claims, 41 Drawing Sheets

(56) References Cited

U.S. PATENT DOCUMENTS

| | | | | |
|---|---|---|---|---|
| 9,195,013 B2* | 11/2015 | Yoshizaki | ............ | G02B 6/3869 |
| 11,002,920 B2* | 5/2021 | Verheyden | ........... | G02B 6/3809 |
| 11,194,102 B2* | 12/2021 | Trauschein | .......... | G02B 6/3821 |
| 2004/0081406 A1* | 4/2004 | Grob | .................... | G02B 6/3849 |
| | | | | 385/76 |
| 2007/0019913 A1* | 1/2007 | Iwai | ..................... | G02B 6/3849 |
| | | | | 385/56 |
| 2010/0284655 A1* | 11/2010 | Nakano | ................ | G02B 6/3825 |
| | | | | 385/78 |
| 2012/0057831 A1* | 3/2012 | Taira | ................... | G02B 6/3849 |
| | | | | 385/78 |
| 2015/0049989 A1* | 2/2015 | Yoshizaki | ............ | G02B 6/3869 |
| | | | | 385/78 |
| 2020/0174199 A1* | 6/2020 | Wong | .................... | G02B 6/406 |
| 2022/0091344 A1* | 3/2022 | Iizumi | ................. | G02B 6/3825 |

* cited by examiner

FIBER OPTIC CONNECTOR

CROSS-REFERENCE TO RELATED APPLICATION

This application claims priority to U.S. Provisional Patent Application No. 63/242,286, filed Sep. 9, 2021, and to U.S. Provisional Patent Application No. 63/252,486, filed Oct. 5, 2021, each of which is hereby incorporated by reference in its entirety.

FIELD

This disclosure generally pertains to a fiber optic connector with a shutter.

BACKGROUND

The prevalence of the Internet has led to unprecedented growth in communication networks. Consumer demand for service and increased competition has driven network providers to continuously search for ways to improve quality of service while reducing cost. In certain applications, there is a need for passive optical interconnect components. The typical passive optical connection system comprises an optical fiber connector and a mating receptacle such as a transceiver interface or connector-to-connector adapter. The optical fiber connector is configured to be plugged into the mating interface. An optical fiber connector typically comprises a connector housing assembly and one or more ferrules terminating one or more optical fibers received in the housing assembly. Optical signals are carried through the fibers and broadcast out of the end of the ferrule. The inventors have recognized that, in some cases (e.g., when the optical signal is a laser signal that could cause injury) there is a need to provide a shutter in front of the ferrule to block the optical signals when the connector is unplugged from the mating interface.

SUMMARY

An optical fiber connector configured to plug into a mating interface comprising a ferrule having a front end portion and a rear end portion spaced apart along a longitudinal axis of the optical fiber connector. The ferrule is configured for terminating one or more optical fibers such that an optical signal carried by each of the one or more optical fibers is transmitted forward from the front end portion of the ferrule. A connector housing holds the ferrule. A retractable shutter comprises a shutter plate and a shutter actuator. The shutter actuator is slidably connected to the connector housing for movement relative to the connector housing between a front position and a rear position. The shutter actuator is configured to engage the mating interface as the optical fiber connector is plugged into the mating interface whereby the shutter actuator moves relative to the connector housing from the front position to the back position. The shutter plate is connected to the shutter actuator such that the shutter actuator is configured to drive the shutter plate to move between an extended position and a retracted position. In the extended position, the shutter plate is located to shield the ferrule. In the retracted position, the shutter plate is located expose the ferrule.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
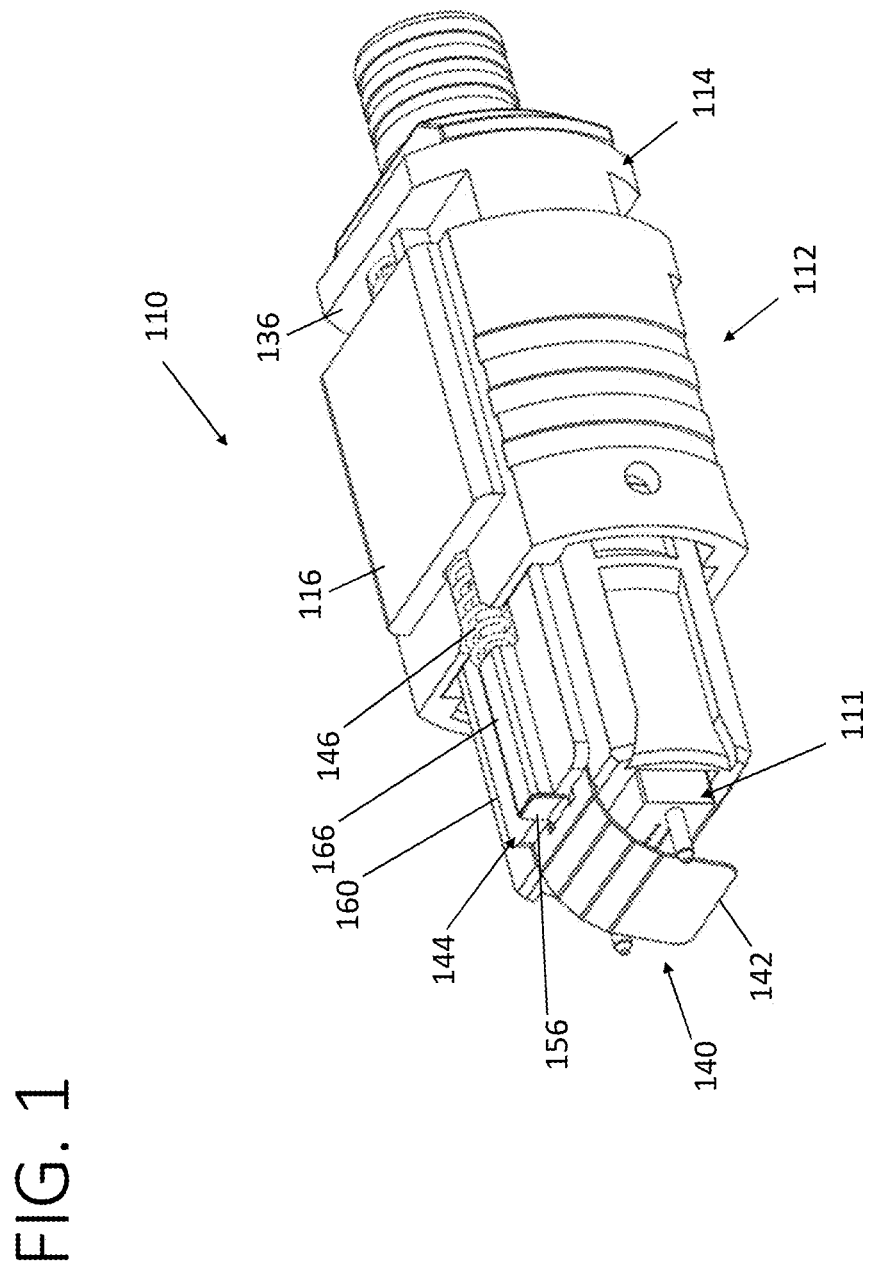
FIG. 1 is a perspective view of an optical fiber connector in accordance with one embodiment of this disclosure.

In the following description, terms "forward" and "rearward" are used for ease of description to indicate the direction in relation to the insertion of a connector to an adapter. For example, the forward direction indicates the insertion direction, and the rearward direction indicates the direction opposing to the insertion direction. Spatial terms, including but not limited to, "lower," "upper," "beneath," "below," "above," and "on top," if used herein, are utilized for ease of description to describe spatial relationships of an element(s) to another as typically depicted in the drawings. Such spatial terms encompass different orientations of the device in use or operation in addition to the particular orientations depicted in the figures and described herein.

In FIGS. 1-26, an exemplary embodiment a shuttered optical fiber connector is generally indicated at reference number 110. In the illustrated embodiment, as shown in FIG. 1, the optical fiber connector 110 is in the form of an MPO-style connector and comprises an MT ferrule 111. It will be apparent that the principles of this disclosure can be adapted to other optical fiber connector styles without departing from the scope of the disclosure. The ferrule 111 has a front end portion and a rear end portion spaced apart along a longitudinal axis LA of the optical fiber connector 110 (as shown in FIG. 6). Ferrules in the scope of this disclosure are generally configured for terminating one or more optical fibers such that an optical signal carried by each of the one or more optical fibers is transmitted forward from the front end portion of the ferrule. In the illustrated embodiment, the MT ferrule 111 is configured to terminate a plurality of optical fibers. In certain embodiments, the ferrule 111 is configured to terminate optical fibers that carry one or more laser signals.

Figure 2:
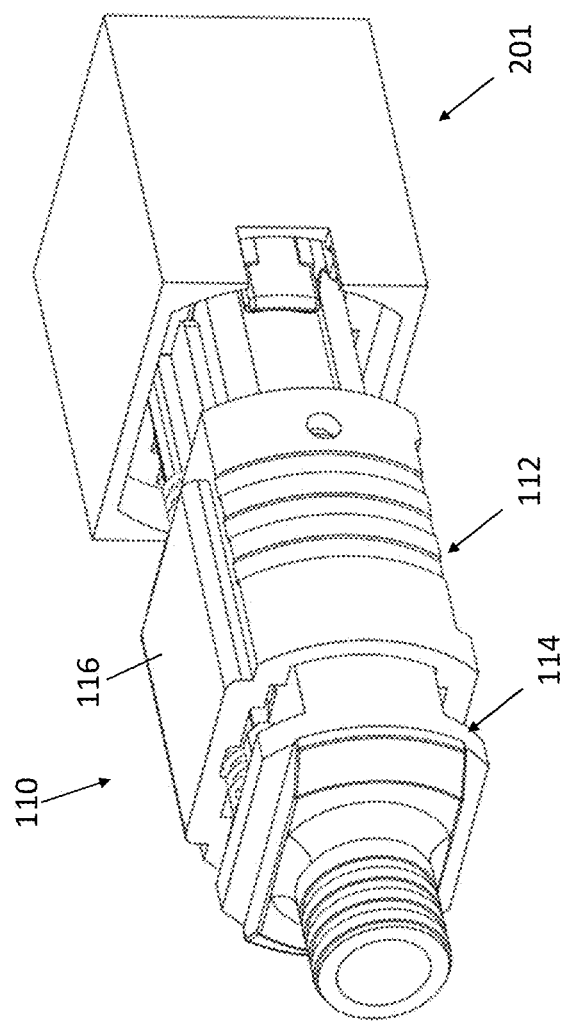
FIG. 2 is a perspective view of the connector being inserted into a mating interface.

In FIG. 2, the connector 110 comprises a connector housing assembly 112 that includes an inner connector housing 114 for holding the ferrule 111. The connector housing assembly 112 also comprises an outer sleeve 116 surrounding the inner connector housing 114.

Figure 3:
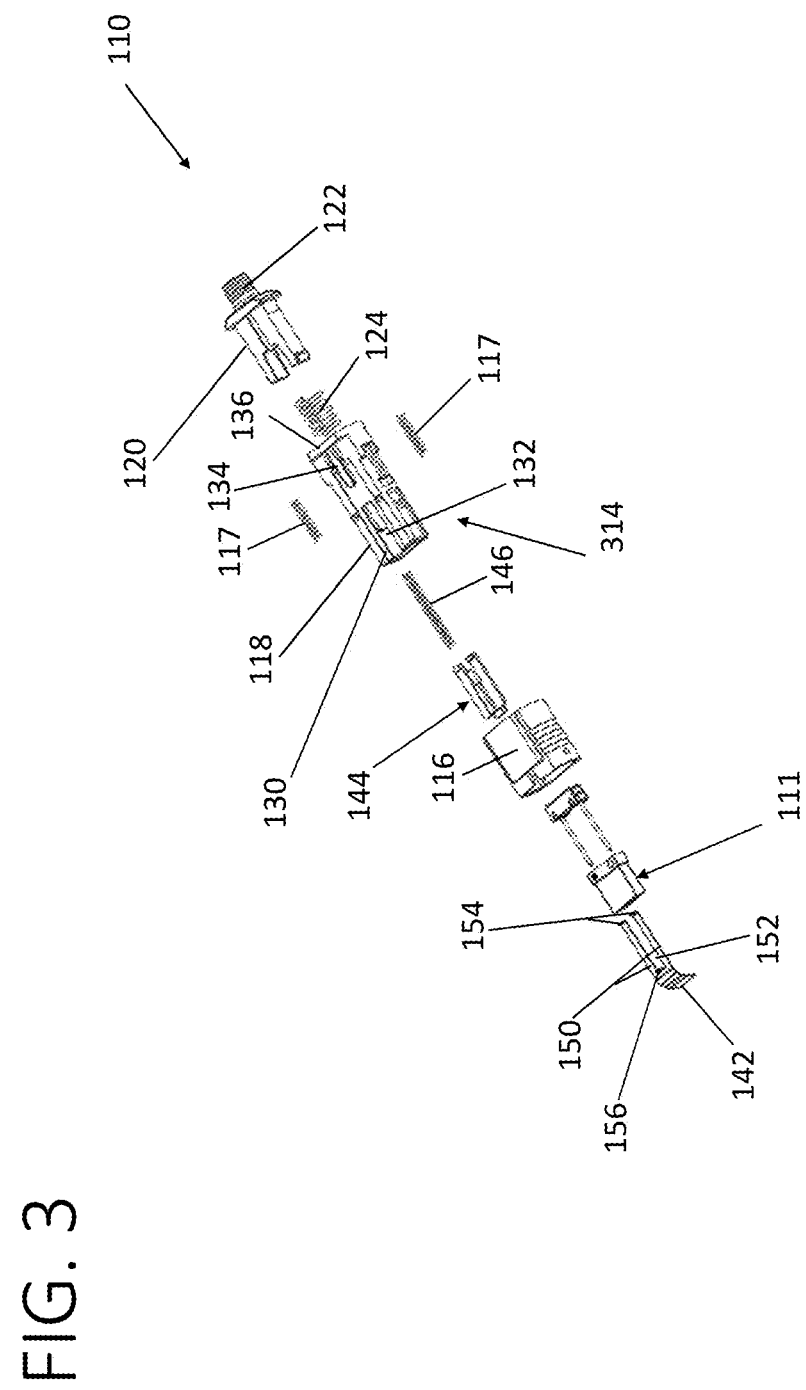
FIG. 3 is an exploded perspective view of the connector of FIG. 1.
Figure 4:
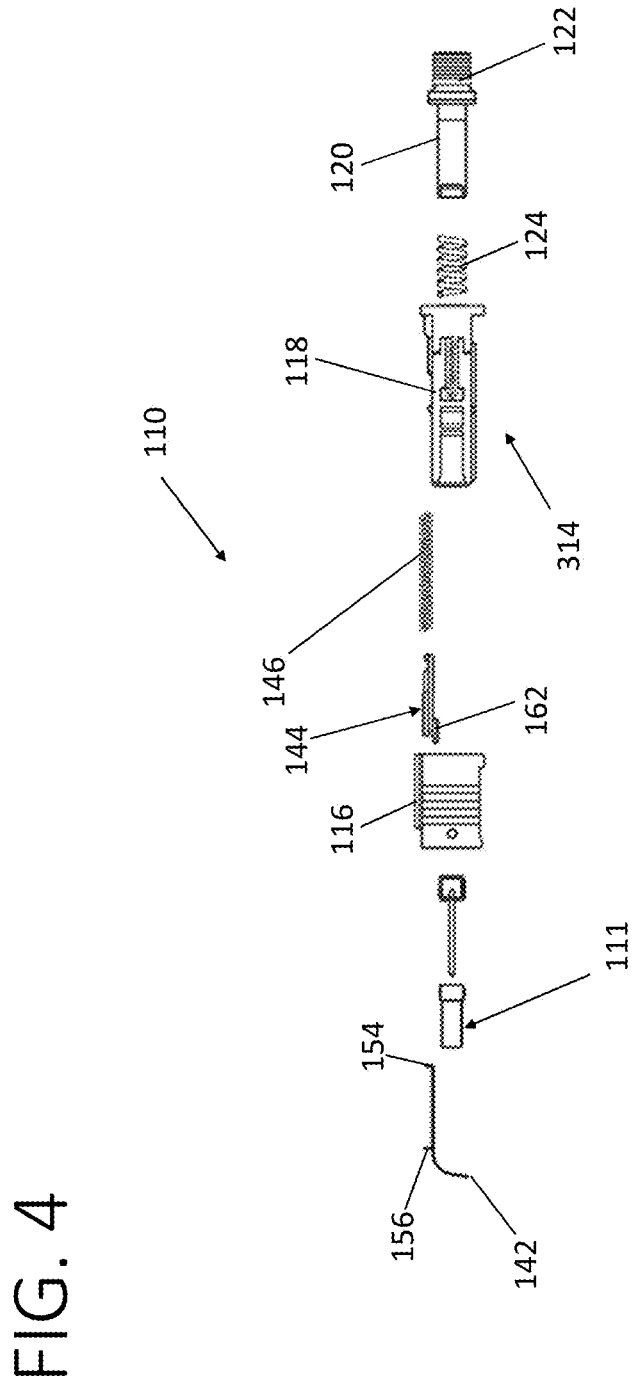
FIG. 4 is an exploded elevation view of the connector of FIG. 1.

In FIG. 3, the housing assembly 112 comprises a pair of sleeve springs 117 that are provided between the outer sleeve 116 and the inner connector housing 114 to yieldably bias the outer sleeve 116 forward in relation to the inner connector housing 114. When the connector 110 is mated with the mating interface 201, the outer sleeve 116 can be pulled back in relation to the inner housing against the biasing force of the spring to unlatch the connector from the mating interface in the same manner as a conventional MPO connector is unlatched from the conventional MPO receptacle.

The inner connector housing 114 comprises a front body 118 and a back body 120 including a back post 122. The back body 120 is configured to attach to the front body 118 to capture the ferrule 111 and a ferrule spring 124 in the inner connector housing 114. In use, the back body 120 braces the ferrule spring 124, and the front body 118 retains the ferrule 111 in the inner connector housing 114 such that the spring yieldably biases the ferrule 111 forward along the longitudinal axis LA in the conventional way.

The front body 118 comprises a perimeter that extends 360 degrees circumferentially about the longitudinal axis LA. The left and right side walls of the front body 118 (broadly, the first and second side walls) are essentially conventional MPO front body side walls comprising recesses for receiving the latch arms of an MPO-style adapter. The upper and lower end walls (broadly, the first and second end walls), by contrast, comprise unconventional features specifically for the shuttered application of the illustrated connector 110. In every drawing for this disclosure except for FIG. 9, one of the end walls of the inner front body 118 is shown in an upper position.

Referring to FIG. 3, the upper wall of the inner front body 118 comprises a plate receiving recess 130, a dovetail groove 132, and a spring cradle 134. The spring cradle 134 is located immediately in front of the conventional back flange 136 of the inner front body 118.

Figure 5:
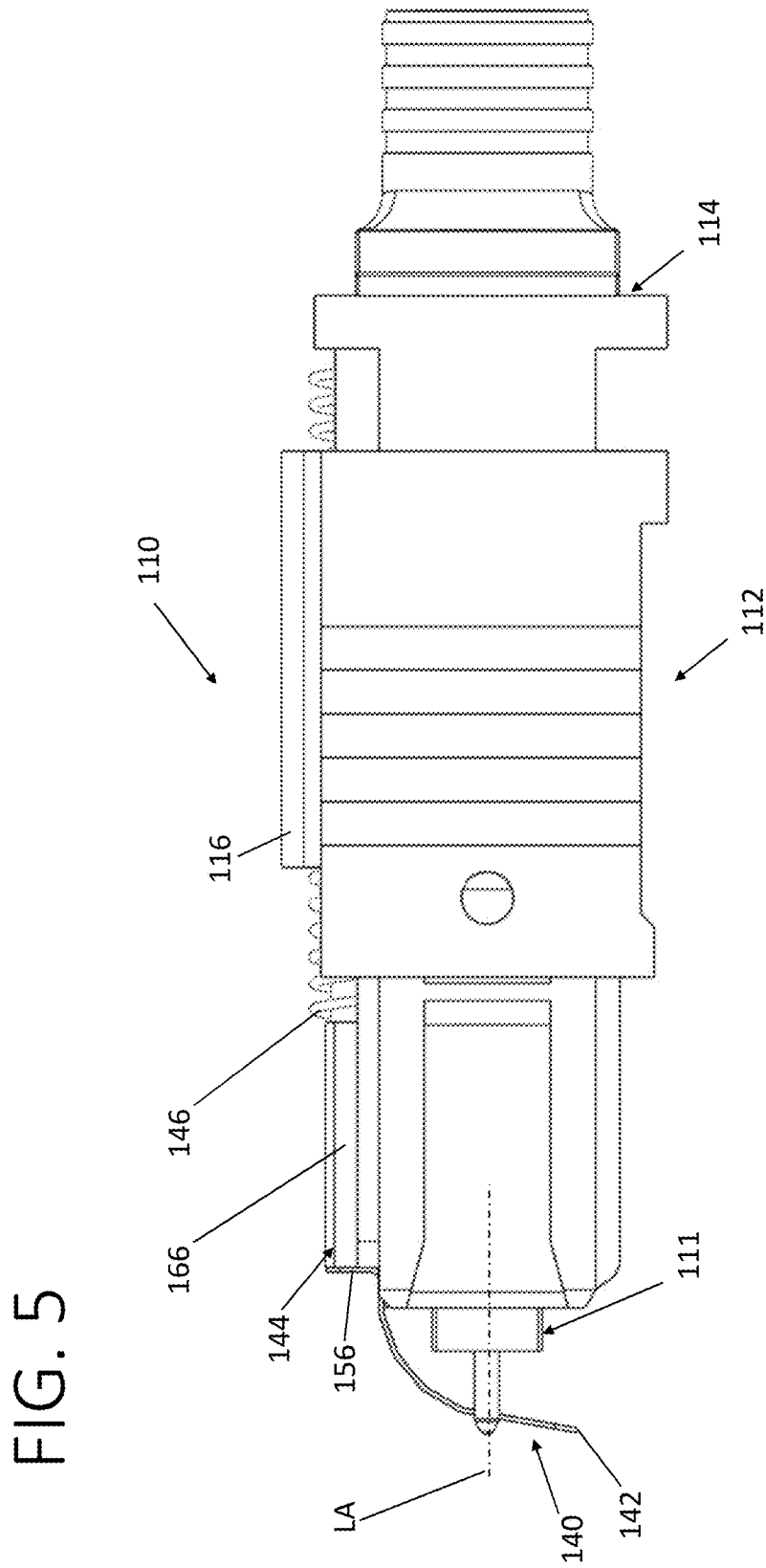
FIG. 5 is a side elevation view of the connector.
Figure 6:
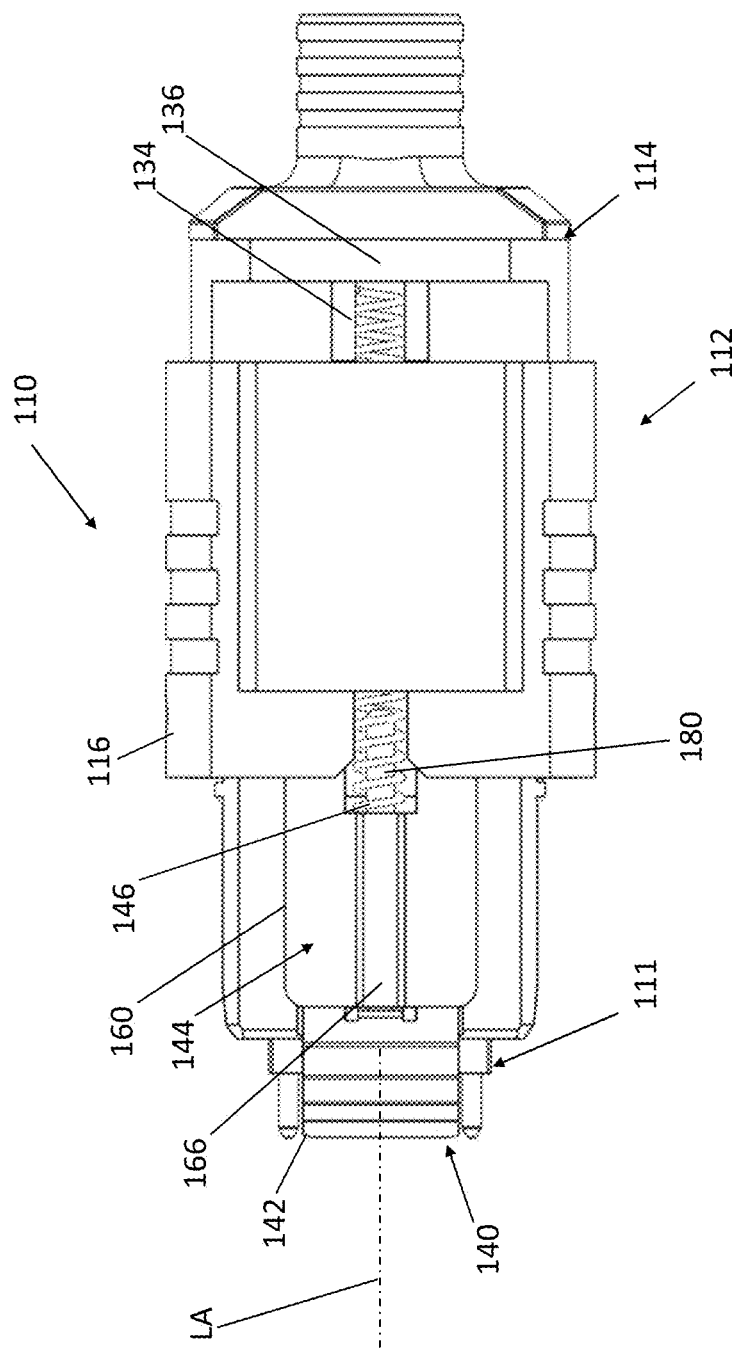
FIG. 6 is a top plan view of the connector.
Figure 7:
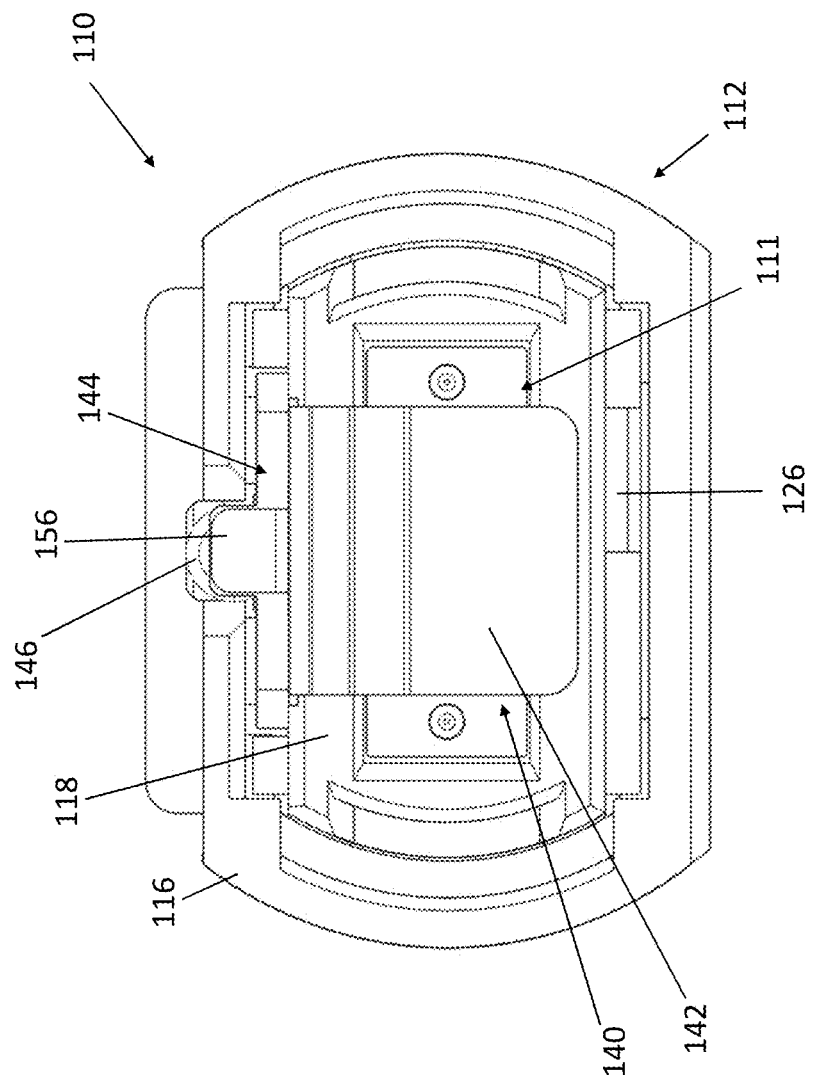
FIG. 7 is front elevation view of the connector.
Figure 8:
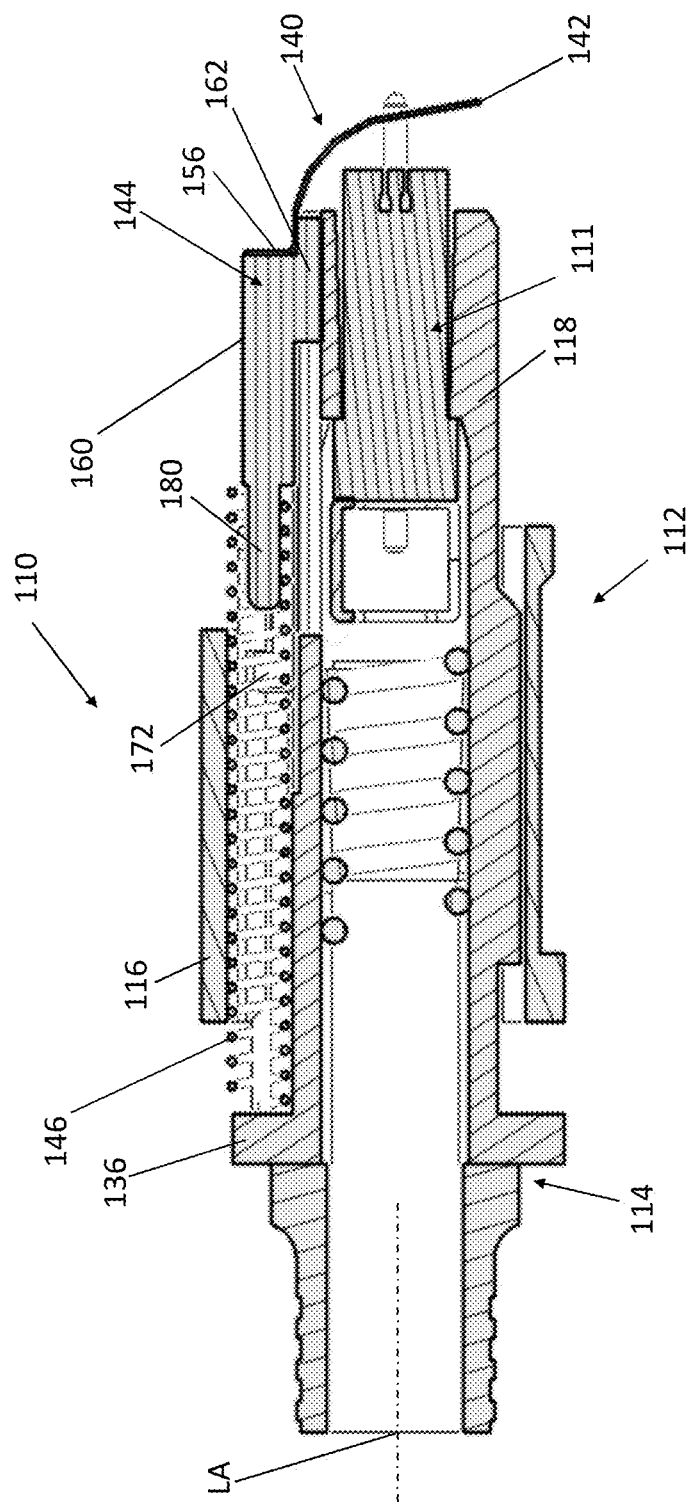
FIG. 8 is a longitudinal section view of the connector.

Referring to FIG. 5, the connector 110 comprises a retractable shutter 140 for selectively covering and uncovering the front end of the ferrule 111. In the illustrated embodiment, the retractable shutter 140 is provided on the top of the inner connector housing 114 and comprises a shutter plate 142, a shutter actuator 144, and a shutter spring 146. The shutter actuator 144 is connected with the shutter plate 142 and engages the shutter spring 146. As explained more fully below, the shutter actuator 144 is movable relative to the inner connector housing 114. The shutter plate 142 is connected to the shutter actuator 144 such that the shutter actuator 144 urges the shutter plate 142 to an extended position when the shutter actuator 144 is in a front position (FIGS. 10 and 12) and the shutter actuator 144 urges the shutter plate 142 to a retracted position when the shutter actuator 144 is in a rear position (FIGS. 11 and 13). In the extended position, as shown in FIGS. 6-7, the shutter plate 142 is located in front of the ferrule 111 to shield the front end of the ferrule 111 for blocking the transmission of optical signal. In the retracted position, as shown in FIG. 11, the shutter plate 142 is located away from the front end of ferrule 111 to expose the front end of ferrule 111. In other words, the shutter plate 142 does not interfere with the optical signal path when retracted.

Referring to FIG. 3, the shutter plate 142 is resiliently deformable and has a front portion and a rear portion spaced apart along the axis LA. In particular, the rear portion of the shutter plate 142 is slidably received in the plate receiving recess 130, and defines first and second laterally spaced apart leg sections 150 separated by a gap 152. Each of the leg sections 150 comprises an upturned foot 154. The shutter plate 142 further comprises an upturned lip 156 spaced apart from the upturned feet 154 along the longitudinal axis LA.

Figure 9:
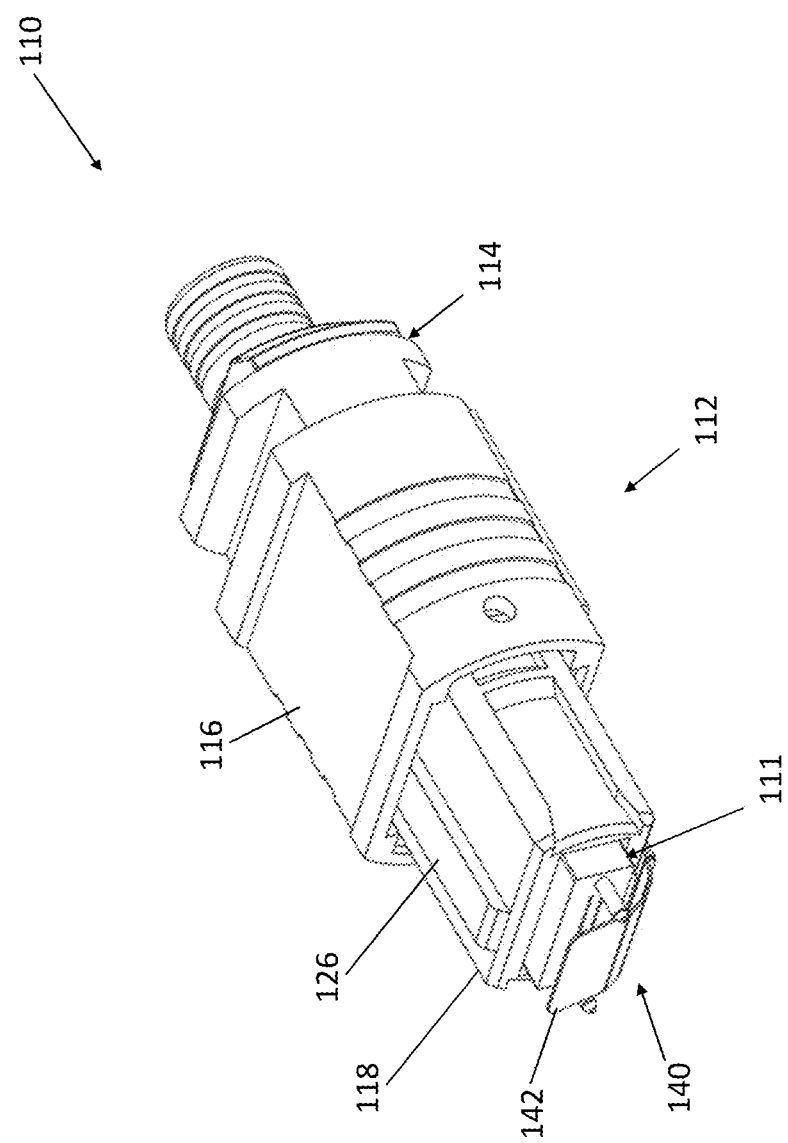
FIG. 9 is a perspective view of the connector in an inverted orientation.

Referring to FIG. 9, the front body 118 comprises a polarity key 126 on the wall opposite the shutter plate 142 (sometimes referred to herein as the bottom wall of the front body, which is shown on top in FIG. 9 because the connector 110 is inverted). Whereas the conventional MPO polarity key is centered laterally between the side walls of the inner front body, the illustrated polarity key 126 is offset from lateral center. This is to distinguish the connector 110 from conventional MPO connectors so the connector 110 is not inadvertently mated with a conventional MPO receptacle. The off-center position of the key 126 can also be seen in FIG. 7.

Figure 10:
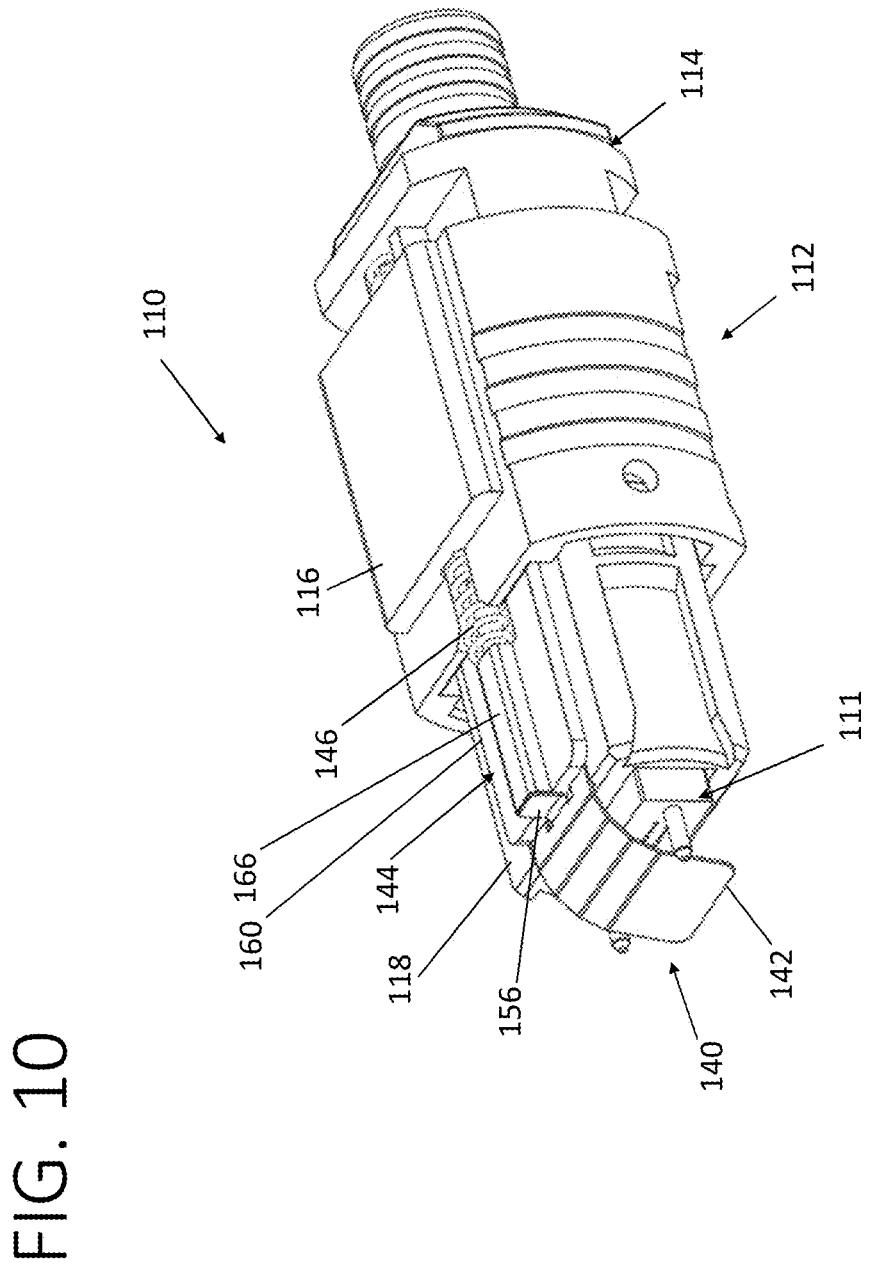
FIG. 10 is a perspective view of the connector in an upright orientation and showing the shutter in an extended position.
Figure 11:
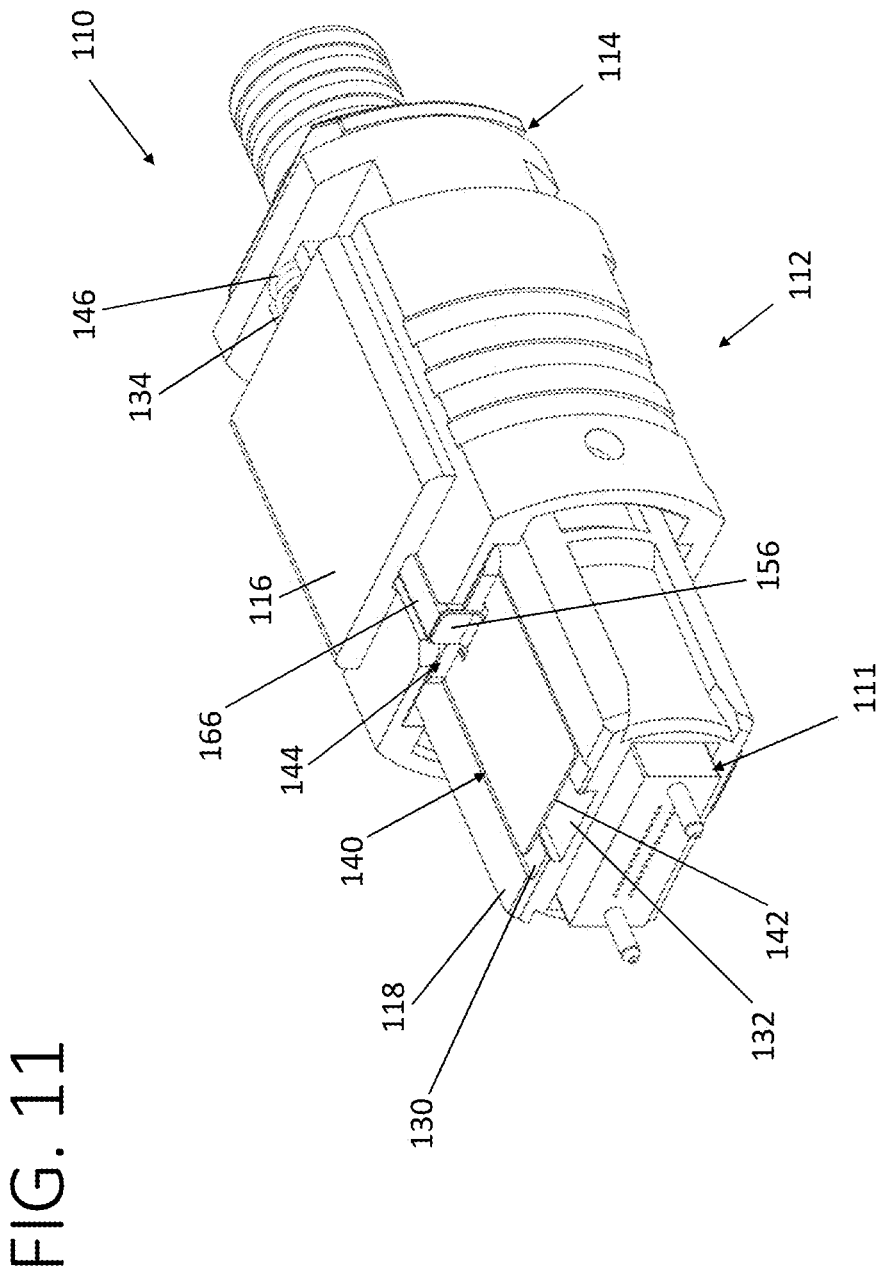
FIG. 11 is a perspective view similar to FIG. 10 but showing the shutter in a retracted position.
Figure 12:
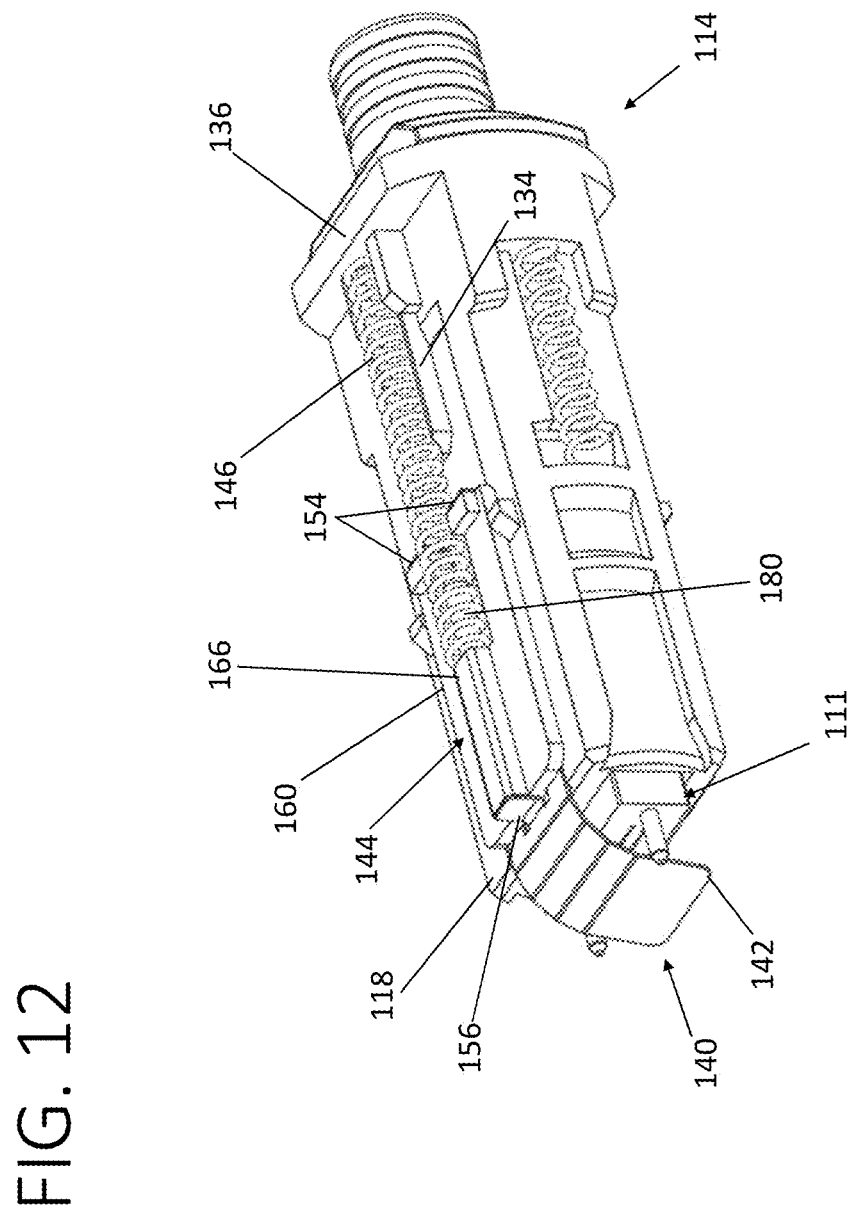
FIG. 12 is a perspective view of the connector in the configuration of FIG. 10 but with an outer sleeve removed to reveal internal features.
Figure 13:
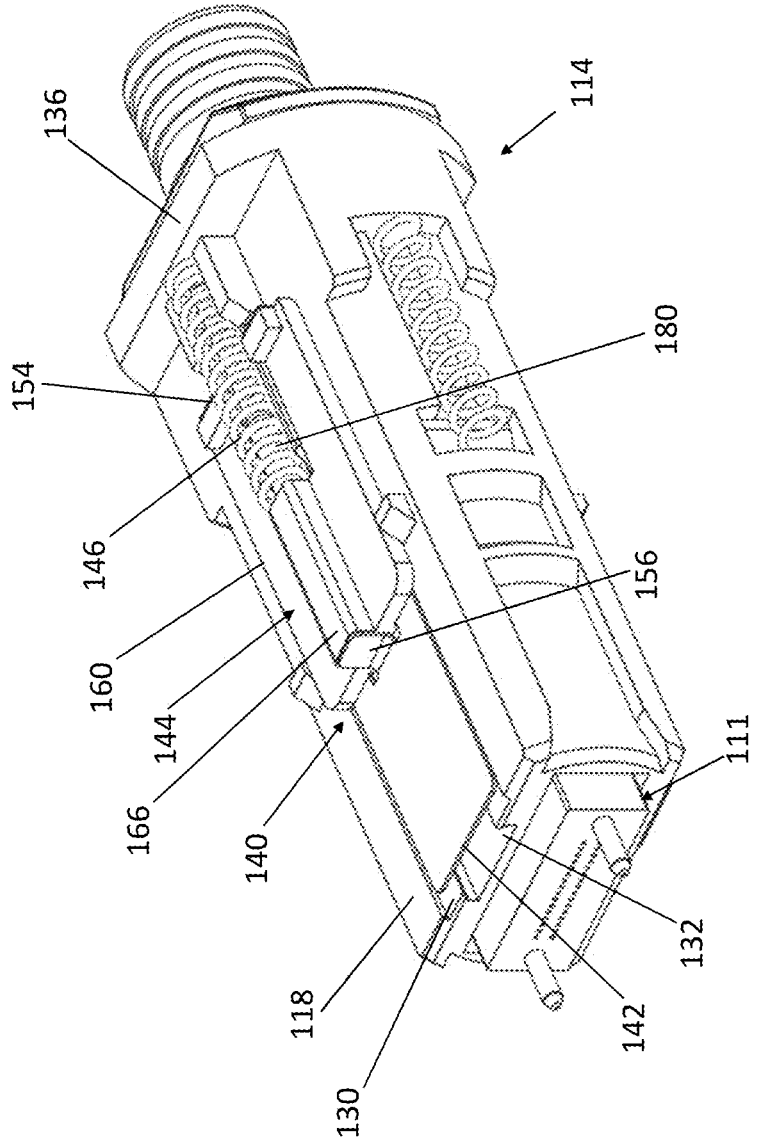
FIG. 13 is a perspective view of the connector in the configuration of FIG. 11 but with the outer sleeve removed to reveal internal features.

Referring to FIGS. 10 and 12, in the extended position, the front portion of the shutter plate 142 extends downward as it extends forward away from the rear portion. This enables the front portion of the shutter plate 142 to shield the front end of the ferrule 111 to block the transmission of optical signals. Referring to FIGS. 11 and 13, in the retracted position, the shutter plate 142 is resiliently deformable such that the shutter plate is configured to flatten as it moves from the extended position to the retracted position. More particularly, the shutter plate 142 slides in the plate receiving recess 130 and the front portion of the shutter plate 142 moves to the top of the front body 118. After moving to the retracted position, when the shutter actuator 144 advances forward, it pushes shutter plate 142 forward. The shutter plate 142 resiliently returns to the extended position, unflattening so that the front portion of the shutter plate 142 extends downward to shield the front end of the ferrule 111.

Referring to FIGS. 14-18, the shutter actuator 144 comprises an actuator body 160 and a dovetail protrusion 162 below the actuator body. The dovetail protrusion 162 is configured to be slidably received in the dovetail groove 132 of the front body 118 and move back and forth therein. The actuator body 160 is connected with the shutter plate 142 and is captured in the longitudinal space between the upturned feet 154 and the upturned lip 156.

Figure 14:
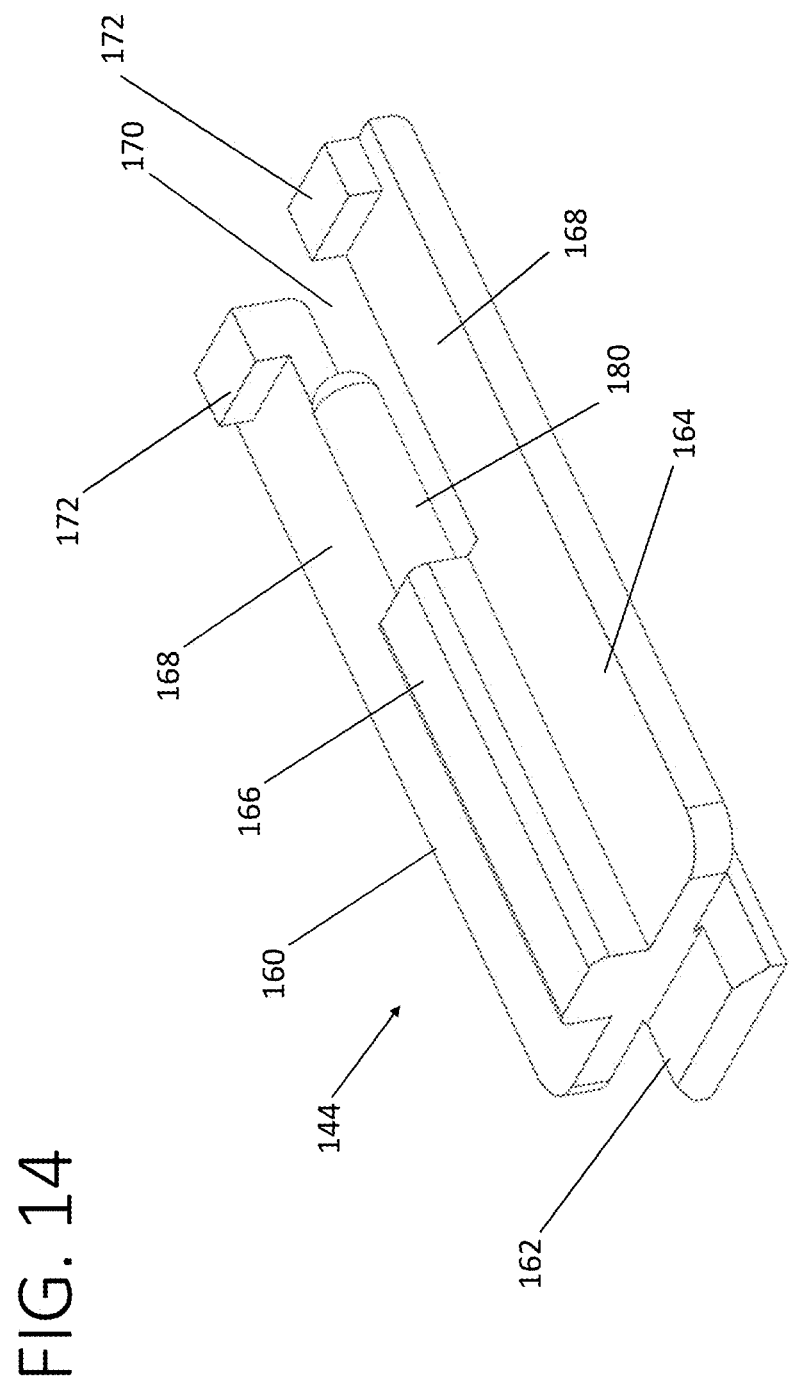
FIG. 14 is a perspective view of a shutter actuator of the connector.
Figure 15:
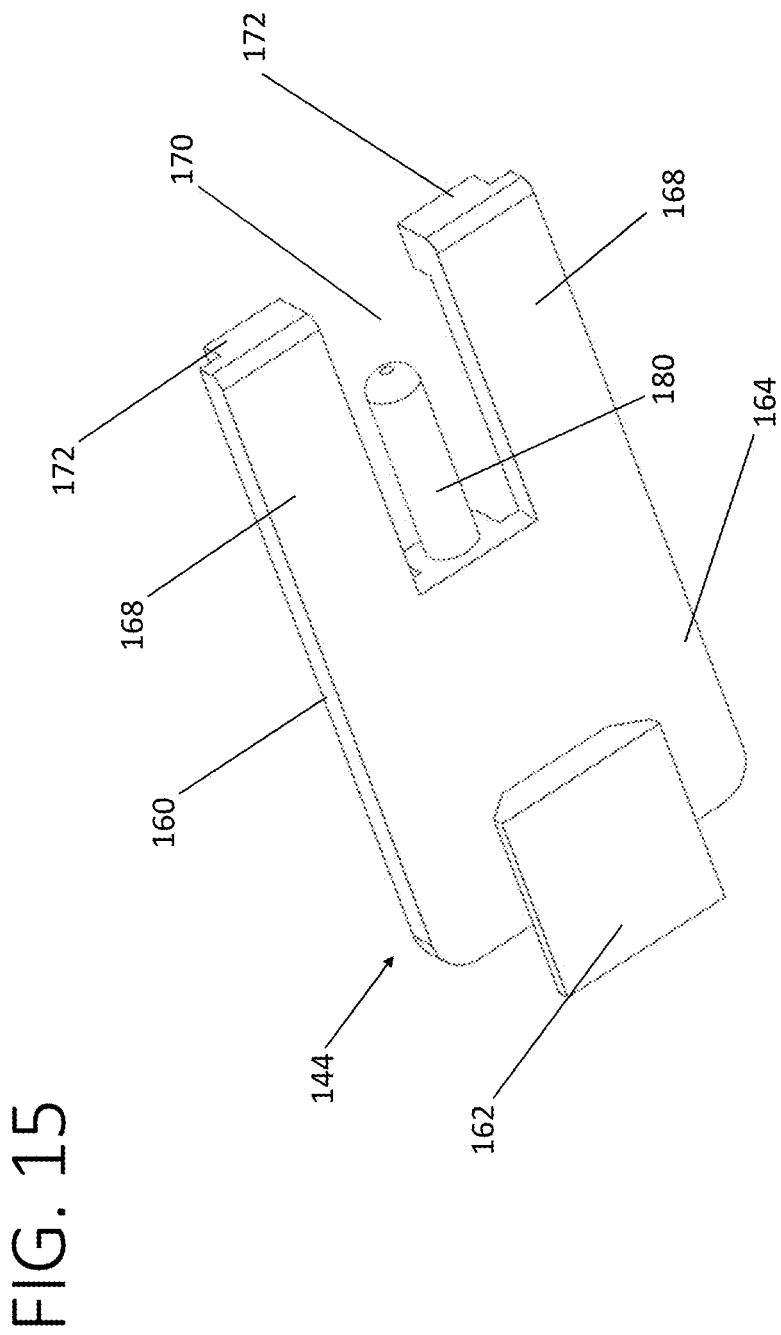
FIG. 15 is a perspective view of the shutter actuator.

In FIG. 14, the actuator body 160 comprises a flat panel portion 164 and a central protrusion 166 protruding upward from the panel portion along the front section of the actuator body. The rear section of the panel portion 164 defines two spaced apart actuator legs 168 separated by a central gap 170. Each actuator leg 168 comprises an upturned foot 172. The upturned feet 172 are configured to cooperate with the front portion of the outer sleeve 116 to prevent the actuator body 160 from sliding off the connector housing assembly 112.

Figure 16:
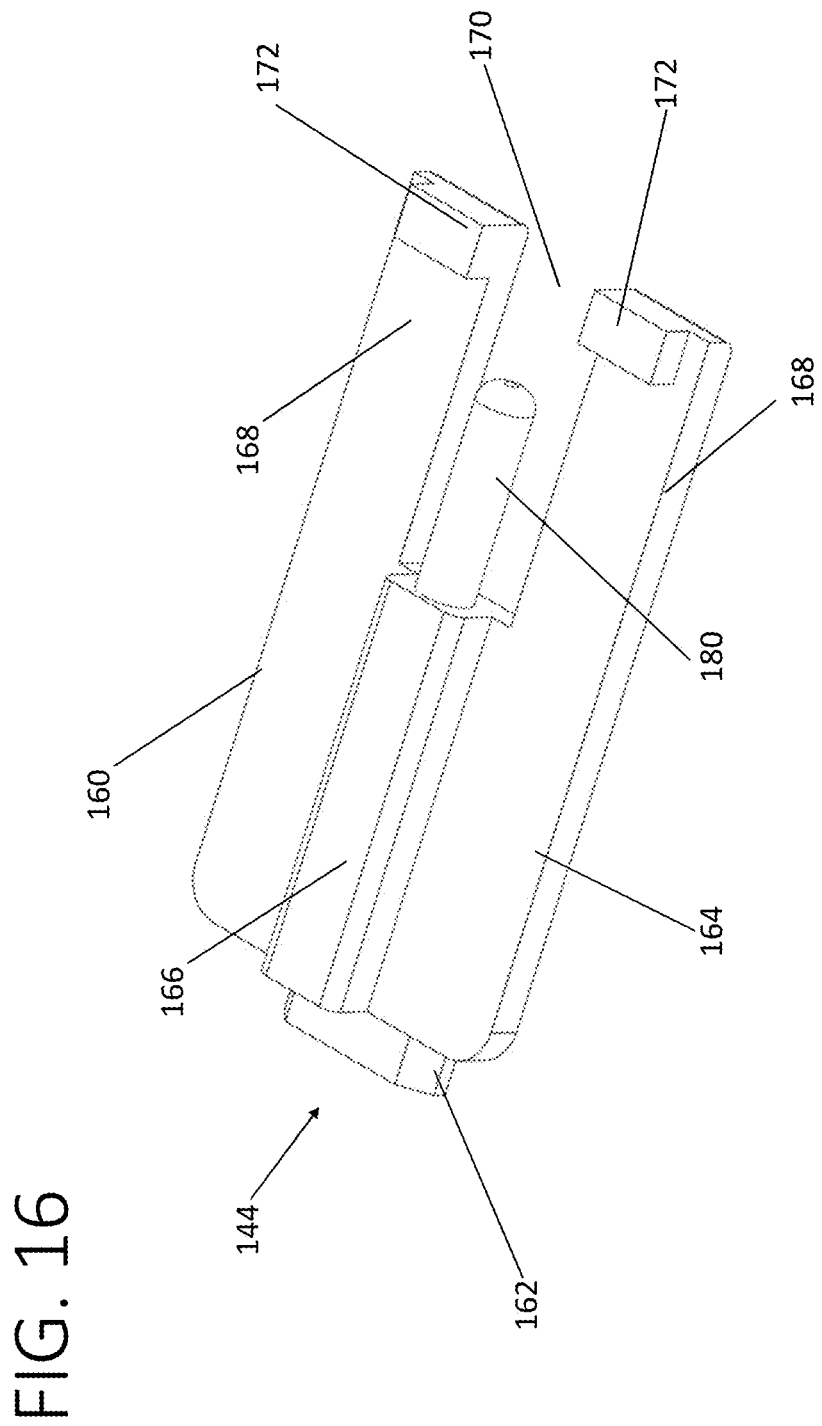
FIG. 16 is a perspective view of the shutter actuator.
Figure 17:
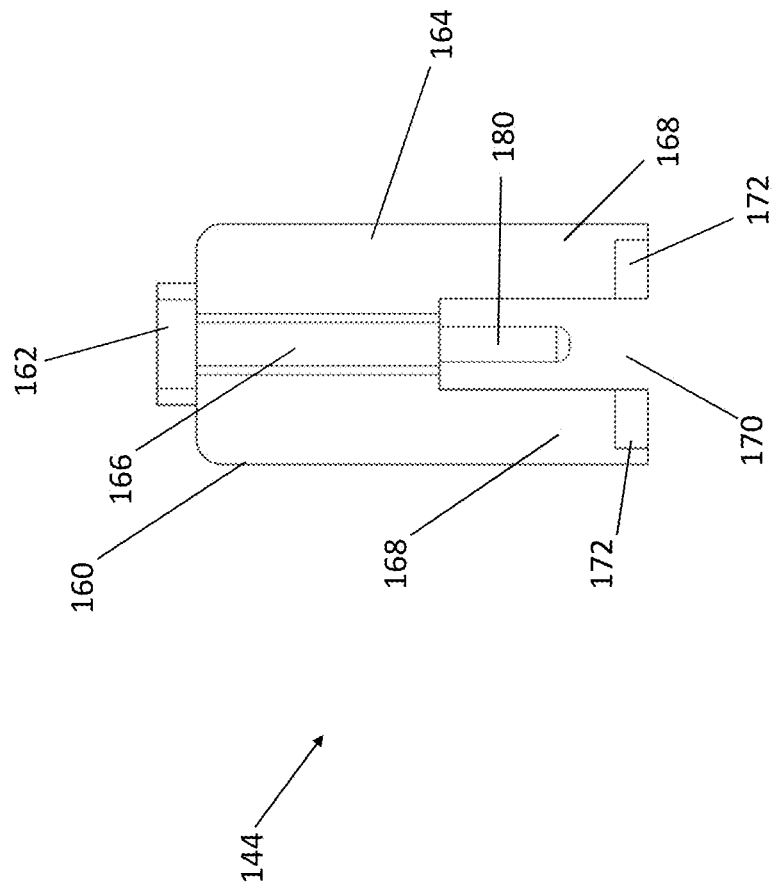
FIG. 17 is a top plan view of the shutter actuator.
Figure 18:
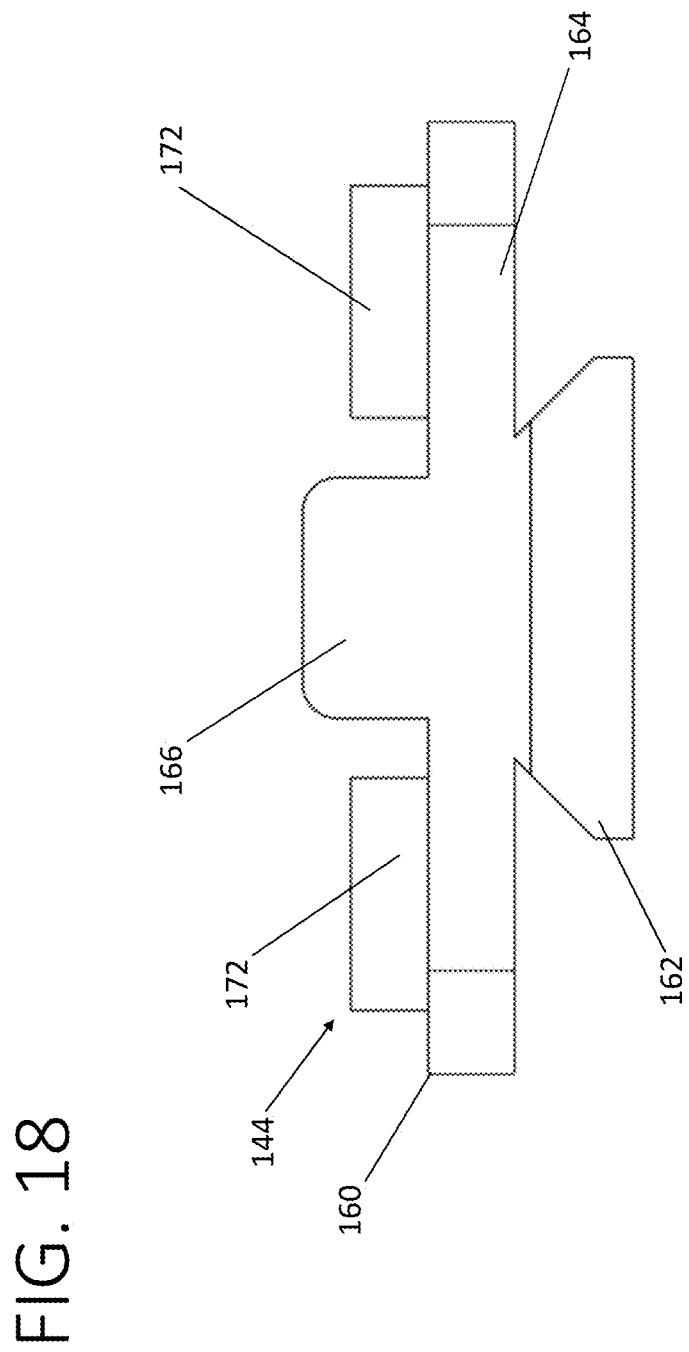
FIG. 18 is an enlarged front elevation view of the shutter actuator.

In FIG. 16, the shutter actuator 144 further comprises a spring holder 180 for holding the shutter spring 146. The shutter spring 146 is retained between the shutter actuator 144 and the inner connector housing 114. The shutter spring 146 is received in the spring cradle 134 on the upper wall of the front body 118 (as shown in FIG. 11). The rear end of the shutter spring 164 engages the back flange 136 such that the shutter spring 146 is compressed between the shutter actuator 144 and the back flange 136, whereby the shutter spring 146 yieldably biases the shutter actuator 146 forward toward the front position. The outer sleeve 116 provides clearance for the shutter actuator 144 and the shutter spring 146.

Figure 19:
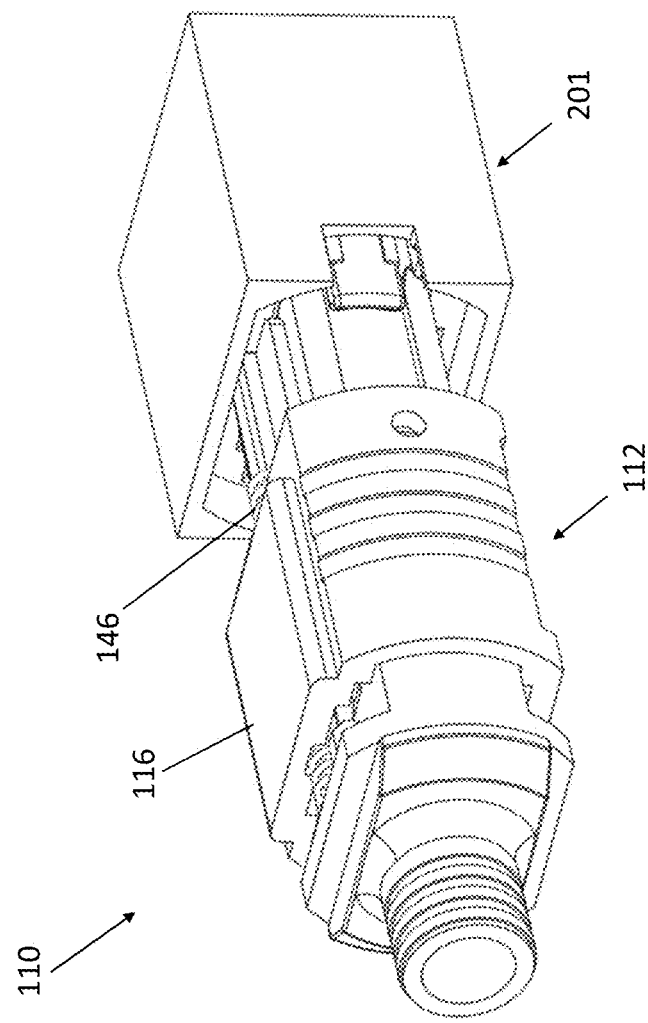
FIG. 19 is a perspective view of the connector being inserted into the mating interface.
Figure 20:
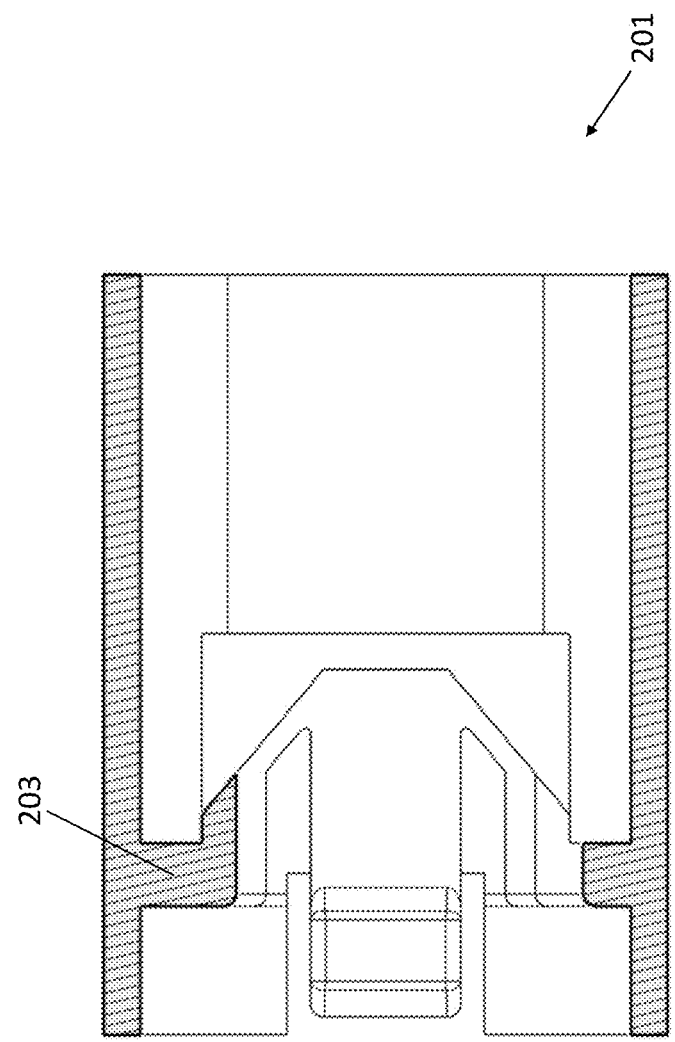
FIG. 20 is a longitudinal section view of the mating interface.
Figure 21:
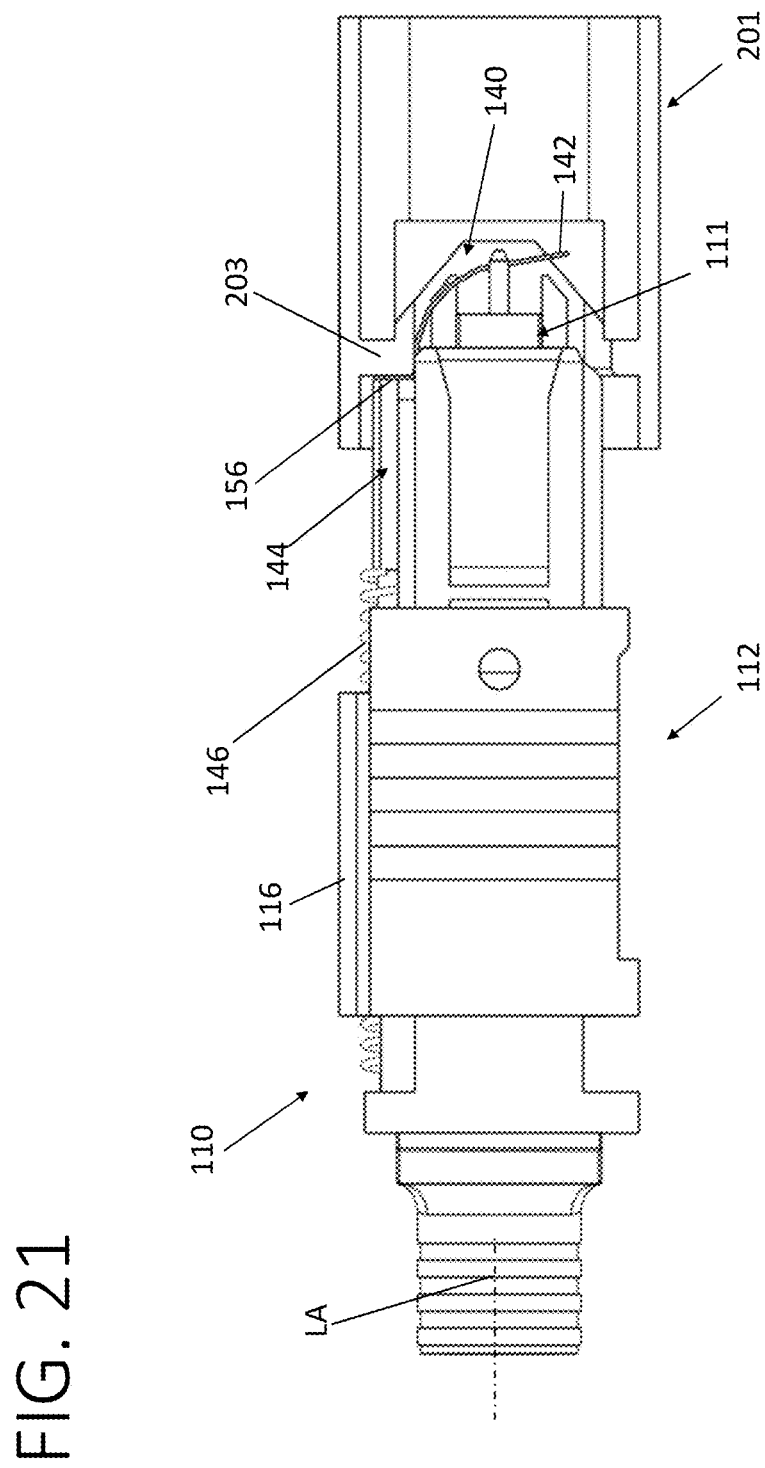
FIG. 21 is an elevation view of the connector being inserted into the mating interface wherein the mating interface is shown in longitudinal section.
Figure 22:
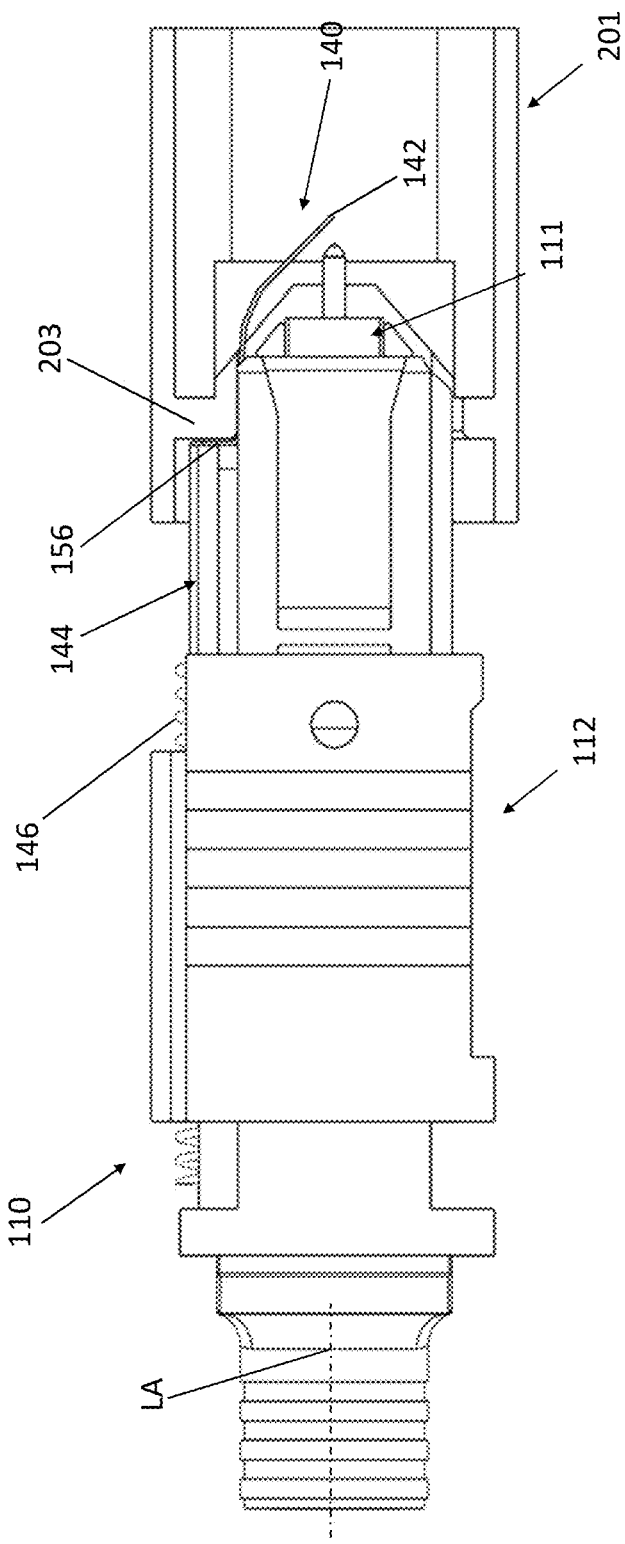
FIG. 22 is an elevation view similar to FIG. 21 wherein the connector is further inserted into the mating interface.
Figure 23:
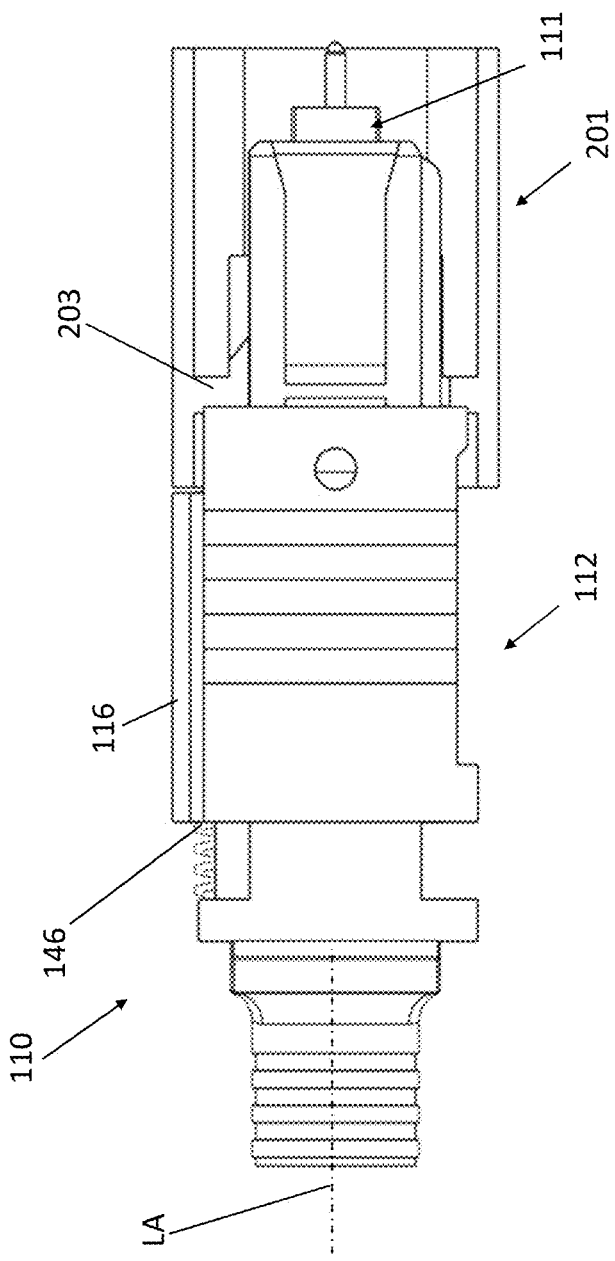
FIG. 23 is an elevation view similar to FIG. 21 wherein the connector is fully inserted into the mating interface.
Figure 24:
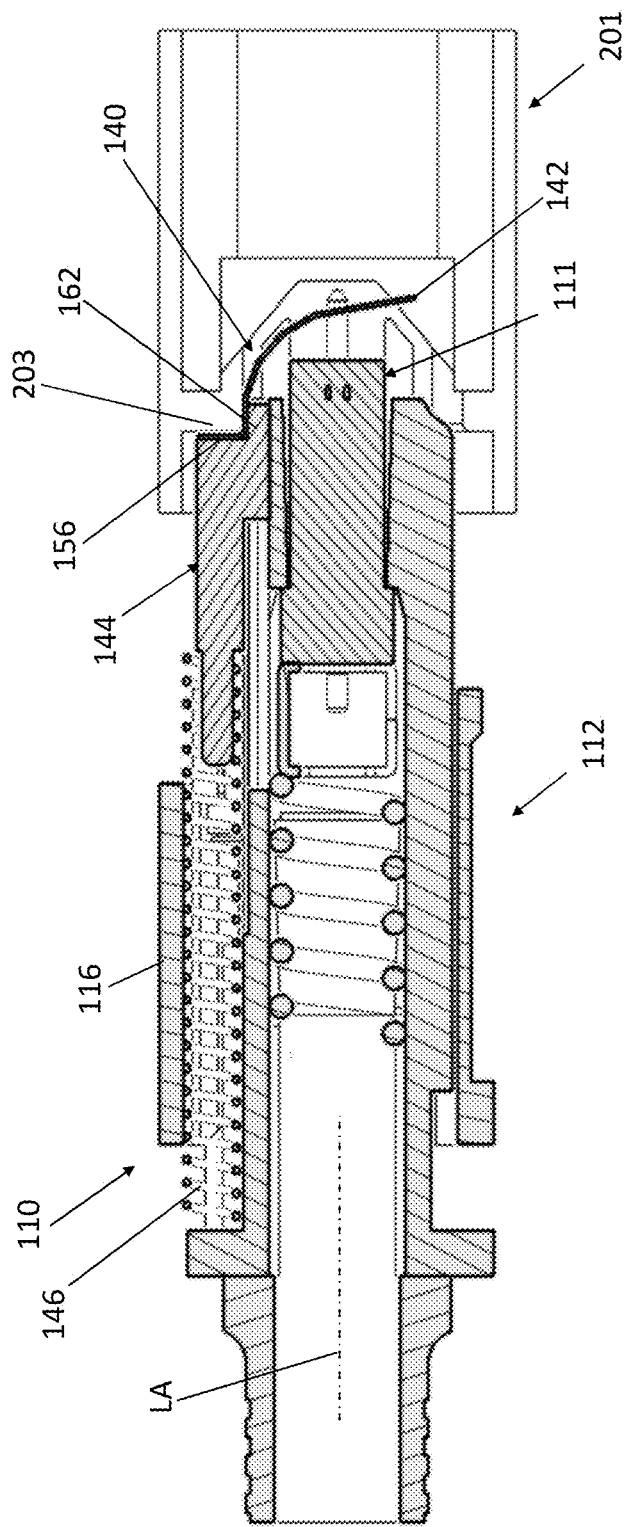
FIG. 24 is a longitudinal section view of the connector being inserted into the mating interface.
Figure 25:
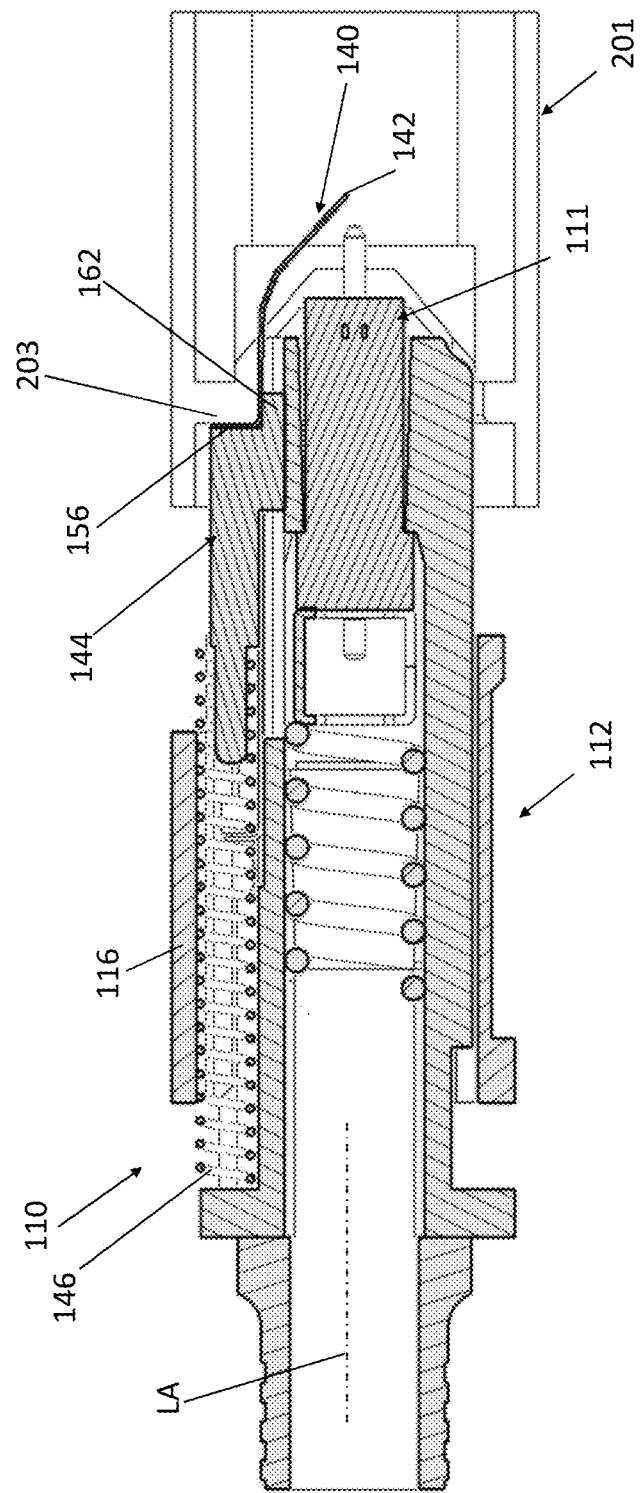
FIG. 25 is a section view similar to FIG. 24 wherein the connector is further inserted into the mating interface.
Figure 26:
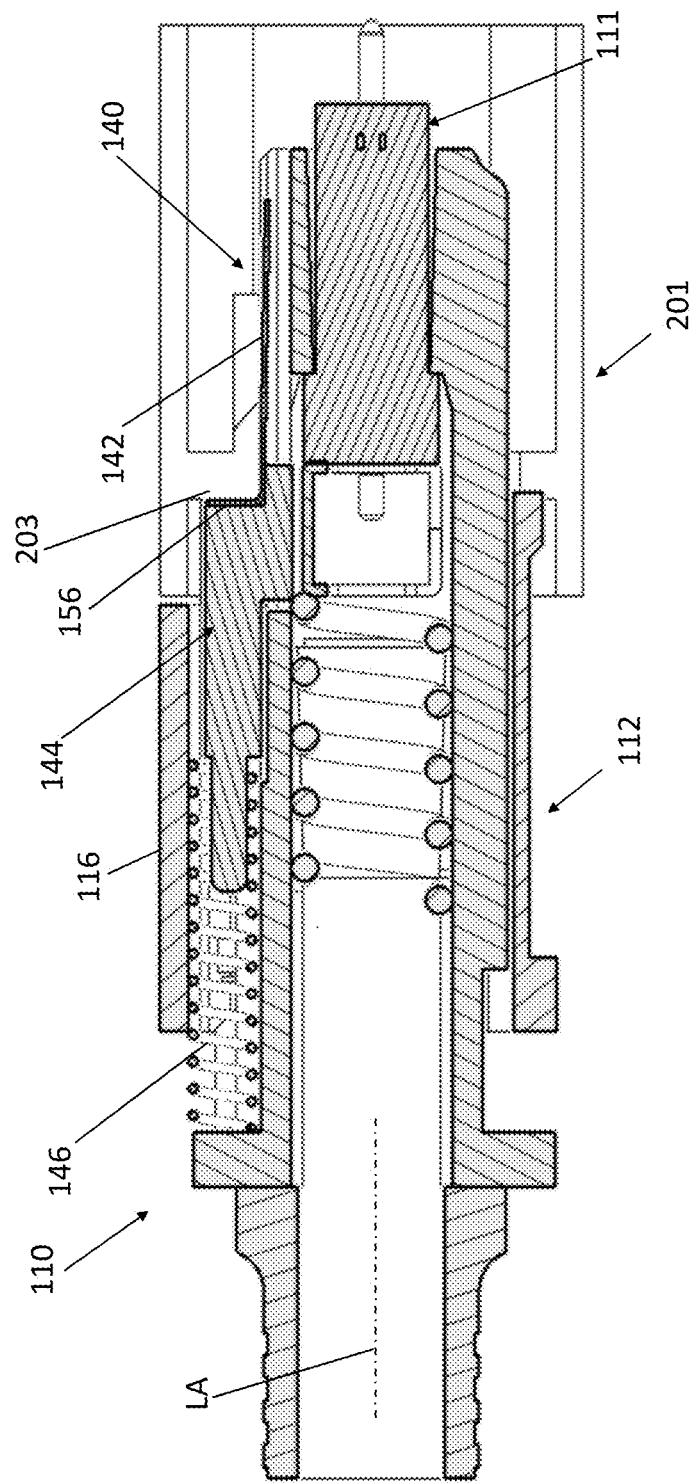
FIG. 26 is a section view similar to FIG. 25 wherein the connector is fully inserted into the mating interface.

Referring to FIG. 19, the front end portion of the actuator body 160 is configured to engage the mating interface 201 as the shuttered connector 110 is plugged into the mating interface. In the illustrated embodiment, as shown in FIG. 20, the mating interface 201 is an MPO-style receptacle with an inner shutter displacement wall 203. As shown in FIGS. 21 and 24, during plug-in, the front end portion of the actuator body 160 initially engages the shutter displacement wall 203 while the shutter actuator 144 is in the front position. With further advancement of the connector 110 into the receptacle 201, the shutter displacement wall 203 prevents the shutter actuator 144 from moving forward and displaces the shutter actuator 144 rearward with respective to the inner housing body 114. The shutter actuator 144 drives the shutter plate 142 rearward as shown in FIGS. 22 and 25. As shown in FIGS. 23 and 26, when the connector 110 is mated with the receptacle 201, the shutter displacement wall 203 of the receptacle displaces the shutter actuator 144 to the rear position and fully retracts the shutter plate 142 so that the ferrule 111 is exposed. The shutter spring 146 is compressed against the flange 136.

Note that in FIGS. 24-26 the shutter displacement wall 203 directly contacts the upturned lip 156 of the shutter plate 142. For purposes of this disclosure, what is shown is considered engagement of the mating interface 201 with the actuator body 160, or more broadly, with the shutter actuator 144, because the shutter displacement wall 203 prevents insertion of the shutter actuator 144 while allowing further insertion of the connector housing 114, thereby displacing the shutter actuator 144 rearward in relation to the connector housing.

When the connector 110 is removed from the receptacle 201, the shutter spring 146 resiliently returns and pushes the shutter actuator 144 forward to the front position and extends the shutter plate 142. The front portion of the shutter plate 142 resiliently rebounds to extend downward in front of the ferrule 111 because of the elastic memory of the shutter plate 142.

Accordingly, it can be seen that the connector 110 provides a retractable shutter 140 that automatically blocks transmission of an optical signal from the ferrule 111 into open space when the connector 110 is unplugged from a mating interface 201. Further, the shutter 140 automatically retracts to allow optical signal transmission when the connector 110 is plugged into the mating interface 201.

Referring now to FIGS. 27-41, another exemplary embodiment a shuttered optical fiber connector is generally indicated at reference number 310. The optical fiber connector 310 is also in the form of an MPO-style connector, though the novel principles of the shutter mechanism being applied here can also be adapted to other connector formats. The illustrated optical fiber connector 310 comprises an MT ferrule 311 that has a front end portion and a rear end portion spaced apart along a longitudinal axis LA' of the connector 310. Again, the ferrule 311 can be configured to terminate optical fibers that carry one or more laser signals.

The connector 310 comprises an MPO-style connector housing assembly 312 that includes an inner connector housing 314 for holding the ferrule 311 so that the tip of the ferrule faces forward away from the housing assembly along a longitudinal axis LA'. The connector housing assembly 312 also comprises an outer sleeve 316 surrounding the inner connector housing 314. Unlike the mating interface 201 for the connector 110, the mating interface 401 for the connector 310 can comprise a conventional MPO receptacle that is also compatible with conventional MPO connectors. In terms of its function, the outer sleeve 316 performs the same function as that of the outer sleeve in a conventional MPO connector. When the connector 310 is mated with the mating interface 401, the outer sleeve 316 can be pulled back in relation to the inner housing 314 against the biasing force of a sleeve spring 317 (which in this case is an integral feature of the outer sleeve) to unlatch the connector from the mating interface in the same manner as a conventional MPO connector is unlatched from the conventional MPO receptacle.

Figure 27:
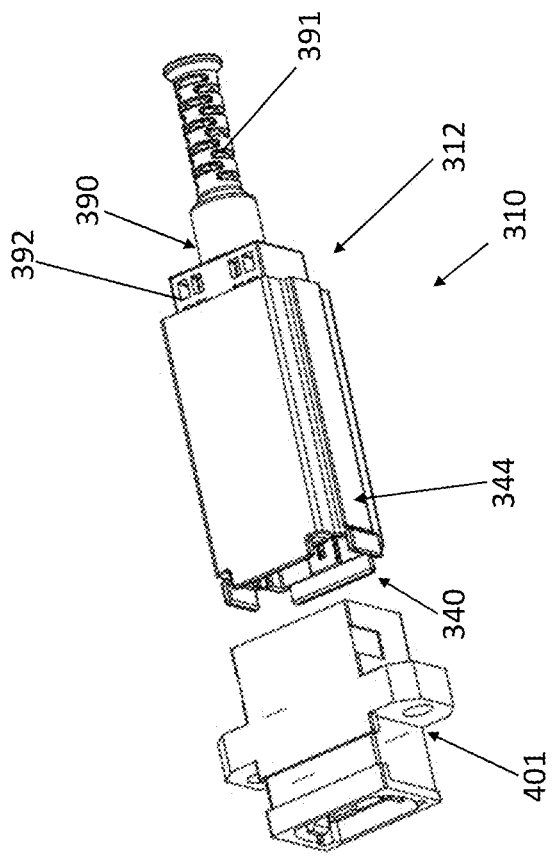
FIG. 27 is a perspective view of another embodiment of an optical fiber connector in accordance with the present disclosure approaching an MPO adapter.
Figure 28:
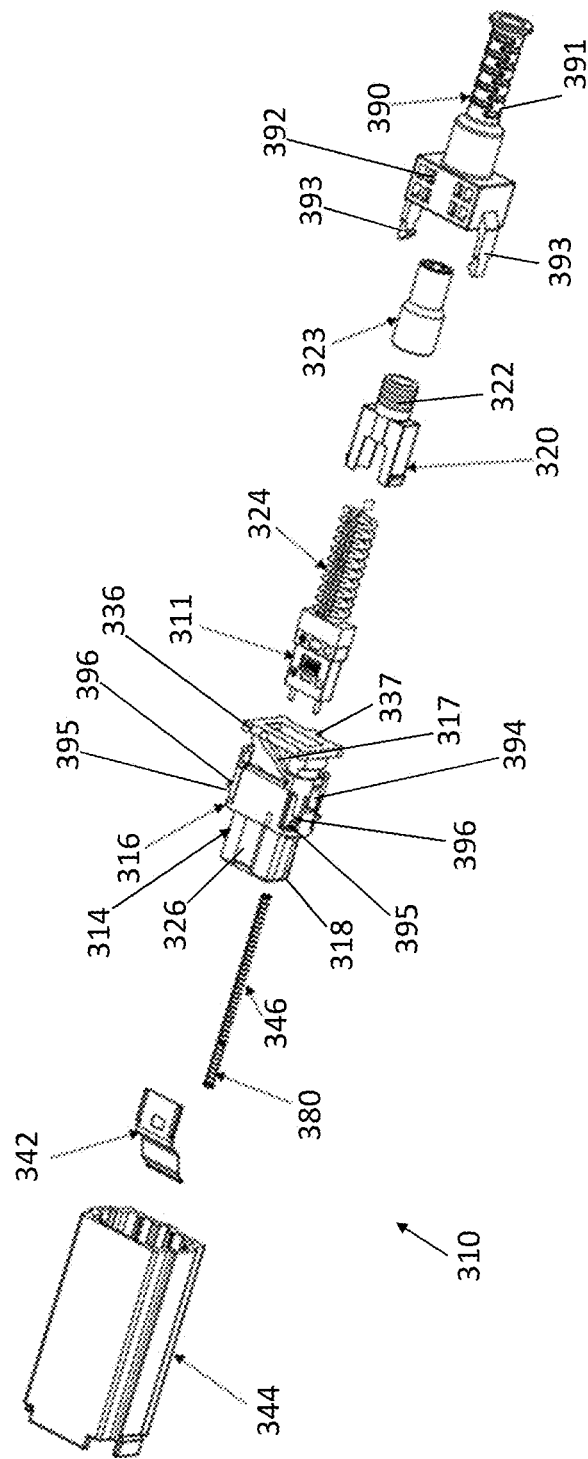
FIG. 28 is an exploded perspective view of the connector of FIG. 27.

For reasons that will become apparent, the shuttered connector 310 comprises a remote release system for actuating the outer sleeve 316 by manual actuation of a remote release element at a location rearwardly spaced from the outer sleeve along the longitudinal axis LA'. In the illustrated embodiment, as shown in FIG. 27, the remote release element comprises a push-pull boot 390 comprising a strain relief boot section 391 and a fastening section 392 for fastening the push-pull boot 390 to the outer sleeve 316. In the illustrated embodiment, as shown in FIG. 28, the fastening section 392 comprises opposing latch arms 393 configured to latch with corresponding latch recesses 394 on the outer sleeve 316. During use, a user can grip the strain relief boot section 391 and pull the push-pull boot 390 rearward. This displaces the push-pull boot 390 and the outer sleeve 316 together in relation to the inner connector housing 314. Hence, the outer sleeve 316 moves rearward for unlatching the connector 310 from a mating interface 401.

In the illustrated embodiment, the outer sleeve 316 also comprises additional unconventional exterior features to facilitate shuttering the connector 310. Particularly, the connector 310 comprises a plurality of exterior latch hooks 395 (each, broadly, a protrusion). Each exterior latch hook 395 comprises a rearward facing stop surface 396. As will be explained in further detail below, the latch hooks 395 and rearward facing stop surfaces 396 form guide and stop features of the connector housing assembly 312 that aid in connecting the connector housing assembly 312 to the shutter mechanism.

Figure 29:
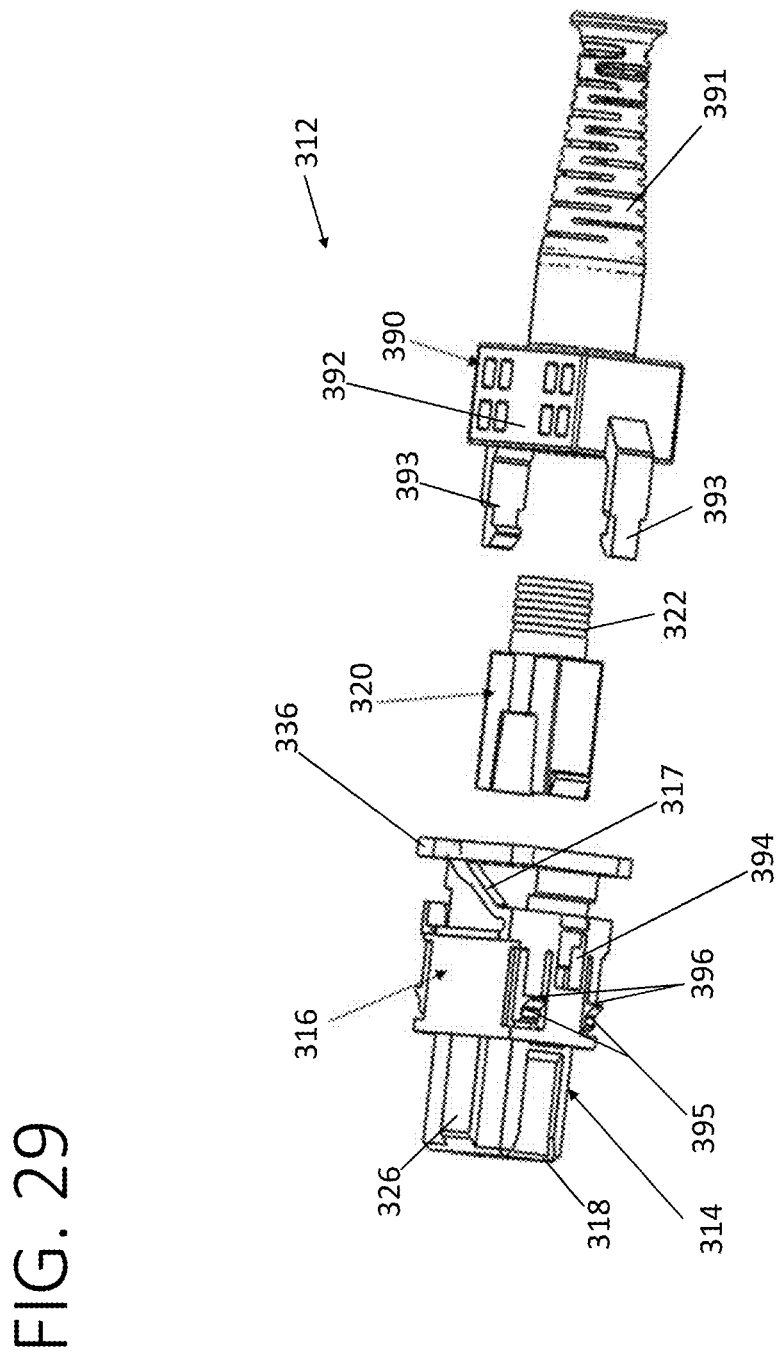
FIG. 29 is an exploded perspective view of a housing assembly of the connector of FIG. 27.

In FIG. 29, the inner connector housing 314 comprises a front body 318 and a back body 320 including a back post 322. The connector housing assembly 312 further comprises a crimp ring 323 for securing strength elements of the cable (not shown) to the back post 322 in the conventional way. The back body 320 is configured to attach to the front body 318 to capture the ferrule 311 and a ferrule spring 324 in the inner connector housing 314. In use, the back body 320 braces the rear end of the ferrule spring 324, and the front body 318 retains the ferrule 311 in the inner connector housing 314 such that the spring yieldably biases the ferrule forward along the longitudinal axis LA' in the conventional way.

The inner front body 318 comprises a perimeter that extends 360 degrees circumferentially about the longitudinal axis LA'. The inner front body 318 is mostly the same as a conventional inner front body of an MPO connector. However, a lower protrusion is 337 is added to the back flange 336 of the inner housing for providing a spring bracing structure as described in further detail below. In one or more embodiments, the spring bracing protrusion 337 comprises a forwardly projecting pin portion. The spring bracing protrusion 337 is located on the bottom end of the inner connector housing 314. Those skilled would understand the spring bracing protrusion 337 could be provided at other position of the inner connector housing 314. The polarity key 326 is opposite the spring bracing protrusion 337 on the upper end of the inner connector housing 314 throughout the drawings. In the illustrated embodiment, the polarity key 326 has the conventional position for an MPO connector.

Figure 30:
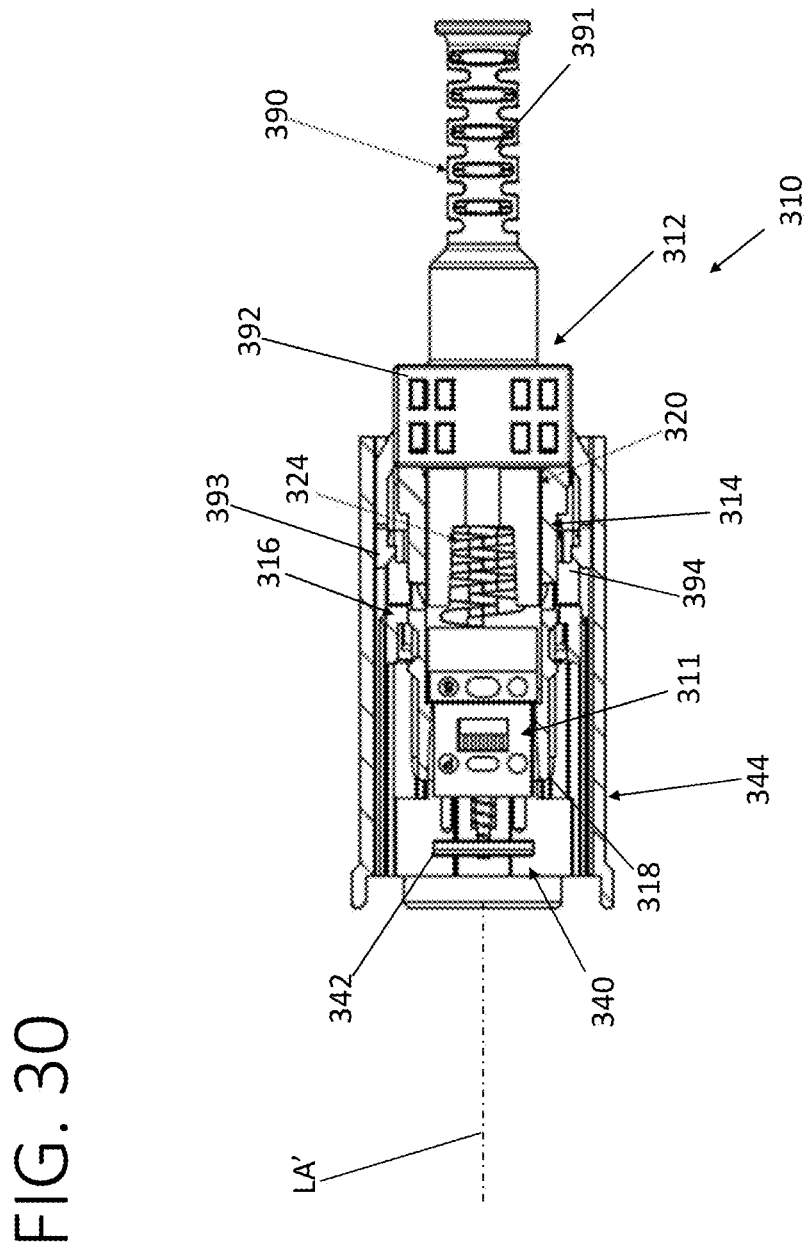
FIG. 30 is a section view of the connector of FIG. 27 taken in a horizontal longitudinal plane.

Like the connector 110, the connector 310 comprises a retractable shutter 340 for selectively covering and uncovering the front of the ferrule 311. In FIG. 30, the retractable shutter 340 is an assembly comprising a deformable shutter plate 342, a shutter actuator 344, and a shutter spring 346. Like the shutter actuator 144, the shutter actuator 344 is movable relative to the connector housing 312 between a front position (FIGS. 27, 30-32, 40) and a back position (FIG. 33). The shutter plate 342 is connected to the shutter actuator 344 such that the shutter actuator positions the shutter plate in an extended position when the shutter actuator is in the front position (FIGS. 27, 30-32, 40) and the shutter actuator positions the shutter plate in a retracted position when the shutter actuator is in the rear position (FIG. 33). In the extended position, the shutter plate 342 is located in front of the ferrule 311 for blocking the optical signals transmitted forward from the front end portion of the ferrule. In the retracted position, the shutter plate 342 is located relative to the ferrule to be clear of each optical signal transmitted forward from the front end portion of the ferrule.

In the illustrated embodiment, the shutter actuator 344 comprises an actuator housing comprising a perimeter that extends circumferentially about the longitudinal axis LA'. The actuator housing 344 is sized and arranged to receive the connector housing assembly 312 inside the actuator housing. The illustrated actuator housing 344 is generally rectangular, comprising opposite left and right side walls (broadly first and second side walls) and opposite upper and lower end walls (broadly, first and second end walls) The upper end wall of the actuator housing 344 comprises internal features configured to mount the shutter plate 342 on the actuator housing.

Referring to FIGS. 31-37, in the illustrated embodiment, the shutter plate 342 comprises a rear portion and a front portion connected by a resilient living hinge 371. The rear portion behind the living hinge 371 is broadly configured for mounting the shutter plate 342 to the actuator housing 344. The front portion in front of the living hinge 371 is configured to extend downward (broadly, radially inward) from the rear portion to cover the front end of the ferrule 311 when extended.

Figure 35:
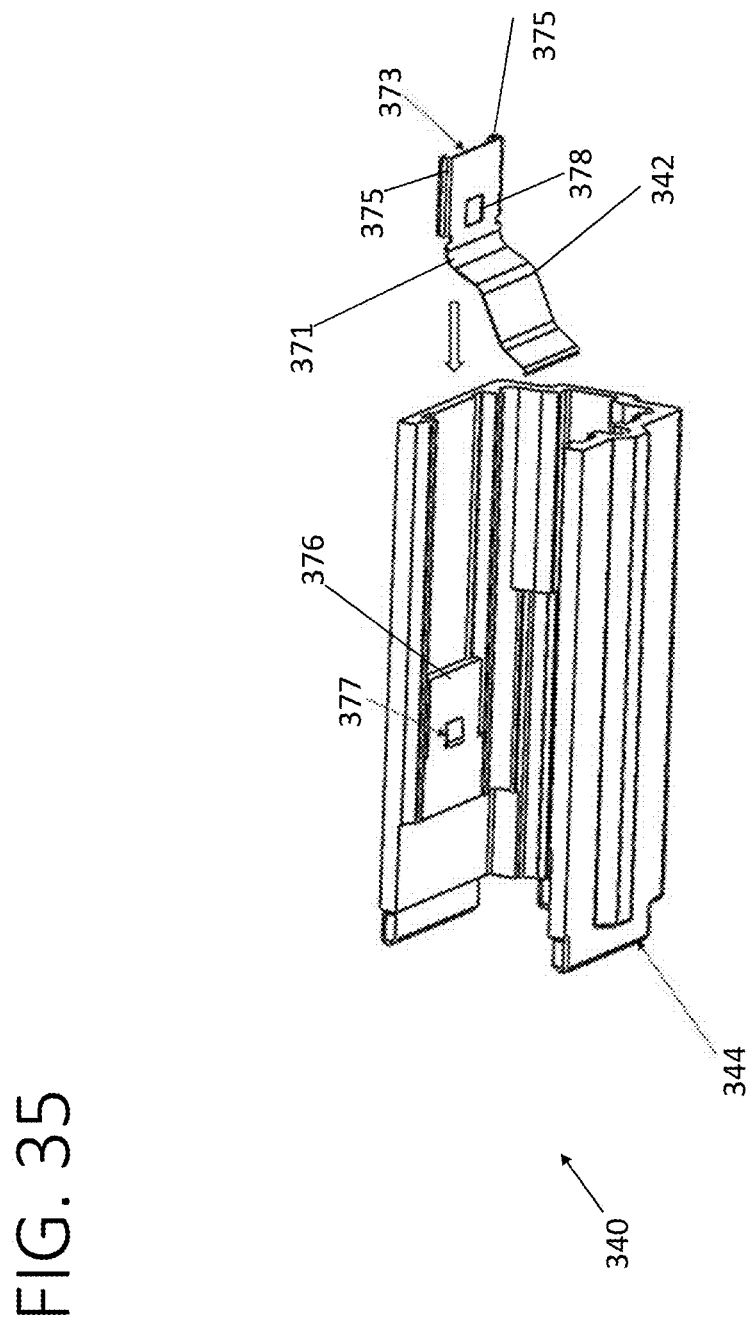
FIG. 35 is an exploded perspective view in vertical section of the subassembly of FIG. 34.
Figure 36:
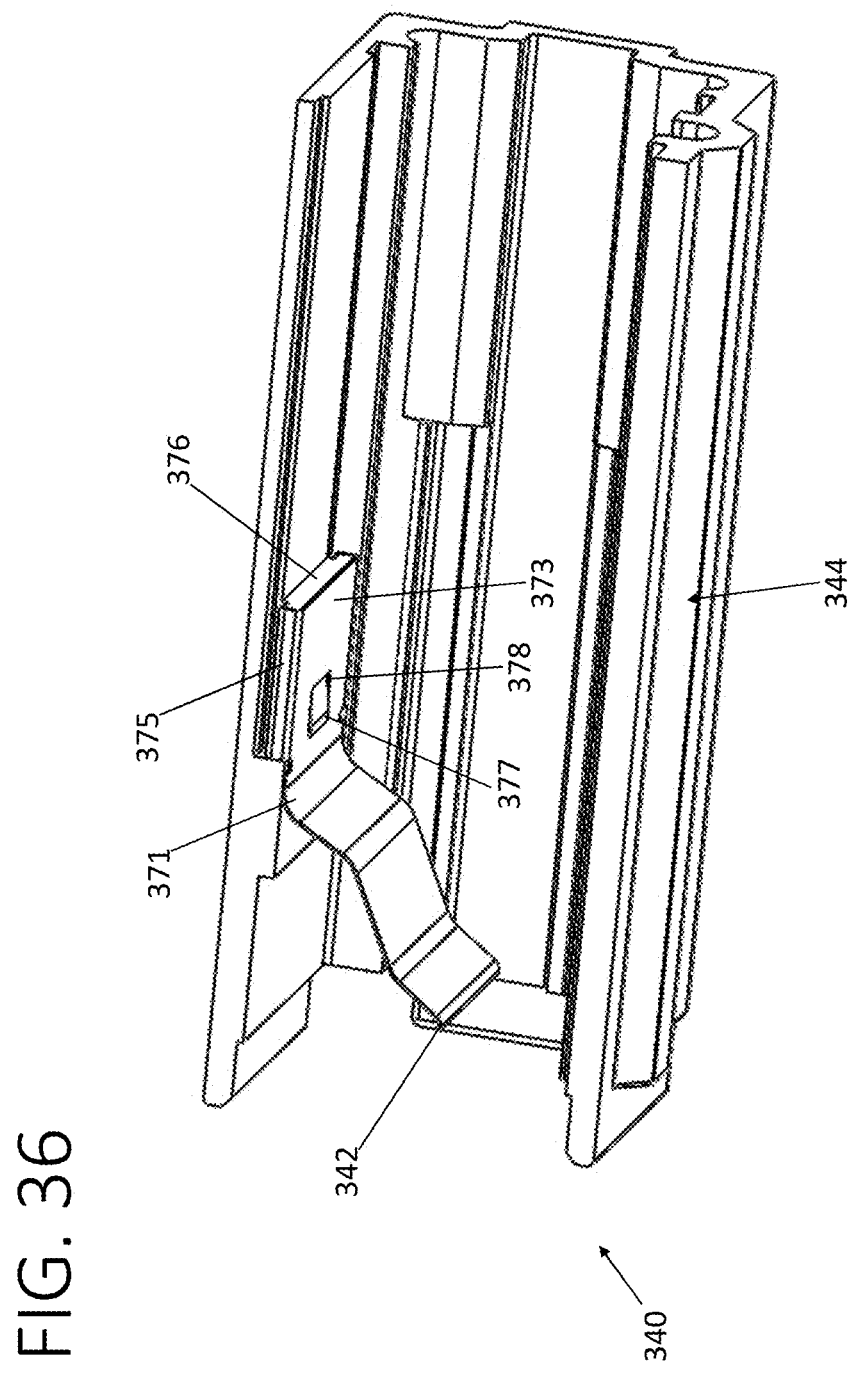
FIG. 36 is a perspective view in vertical section of the subassembly of FIG. 34.
Figure 37:
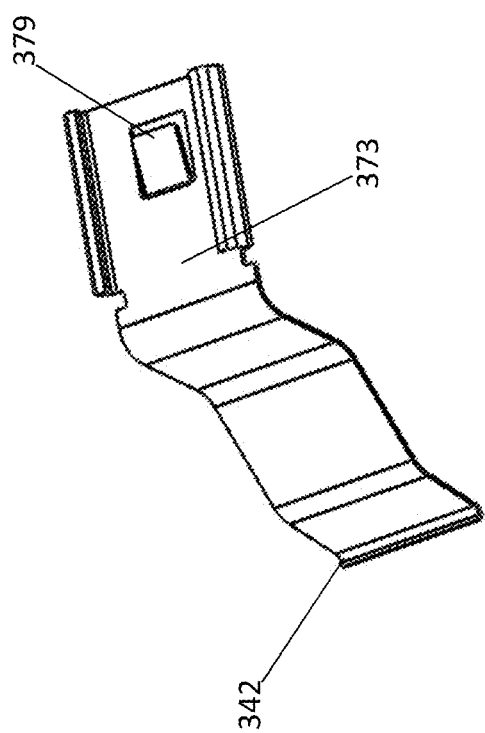
FIG. 37 is a perspective view of an alternative embodiment of a shutter plate.

Referring to FIGS. 35-36, the rear portion of the shutter plate comprises a plate section 373 and upturned longitudinal rails 375 on opposite sides of the plate section. The plate section 373 and the upturned longitudinal rails 375 define a channel configured to receive an interior tongue portion 376 of the upper wall of the actuator housing 344 therein. The upturned longitudinal rails 375 are generally C-shaped and the interior tongue portion 376 has a dovetail shape such that the rear portion of the shutter plate 342 and the underside tongue portion of the housing 344 together define a dovetail joint that connects the shutter plate to the upper wall of the housing. The interior tongue portion 376 defines a downwardly protruding tab 377, and the plate section 373 of the rear portion of the shutter plate 342 defines a latch recess 378. The downwardly protruding tab 377 is configured to snap into the latch recess 378 to secure the shutter plate 342 to the upper wall when the rear portion is pressed onto the interior tongue portion 376. Referring to FIG. 37, in an alternative embodiment, the plate portion 373 of the rear section of the shutter plate comprises an upturned latch tab 379 that is configured to snap into a corresponding recess (not shown) on the underside tongue portion of the actuator housing to secure the shutter plate to the housing.

Figure 31:
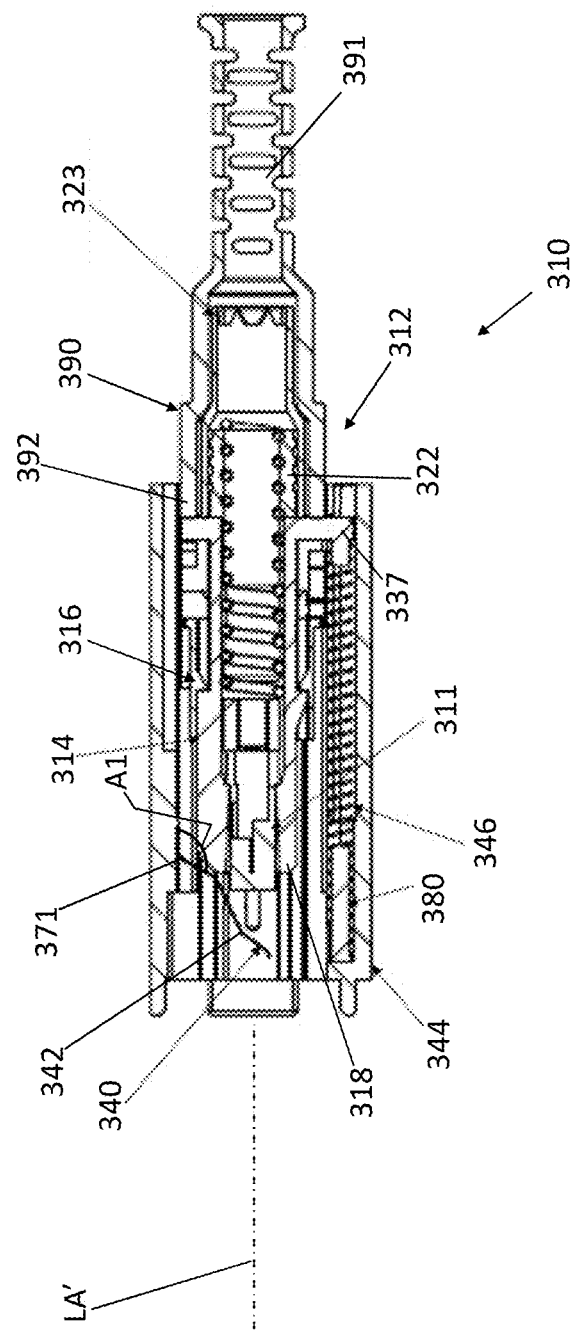
FIG. 31 is a section view of the connector of FIG. 27 taken in a vertical longitudinal plane.
Figure 32:
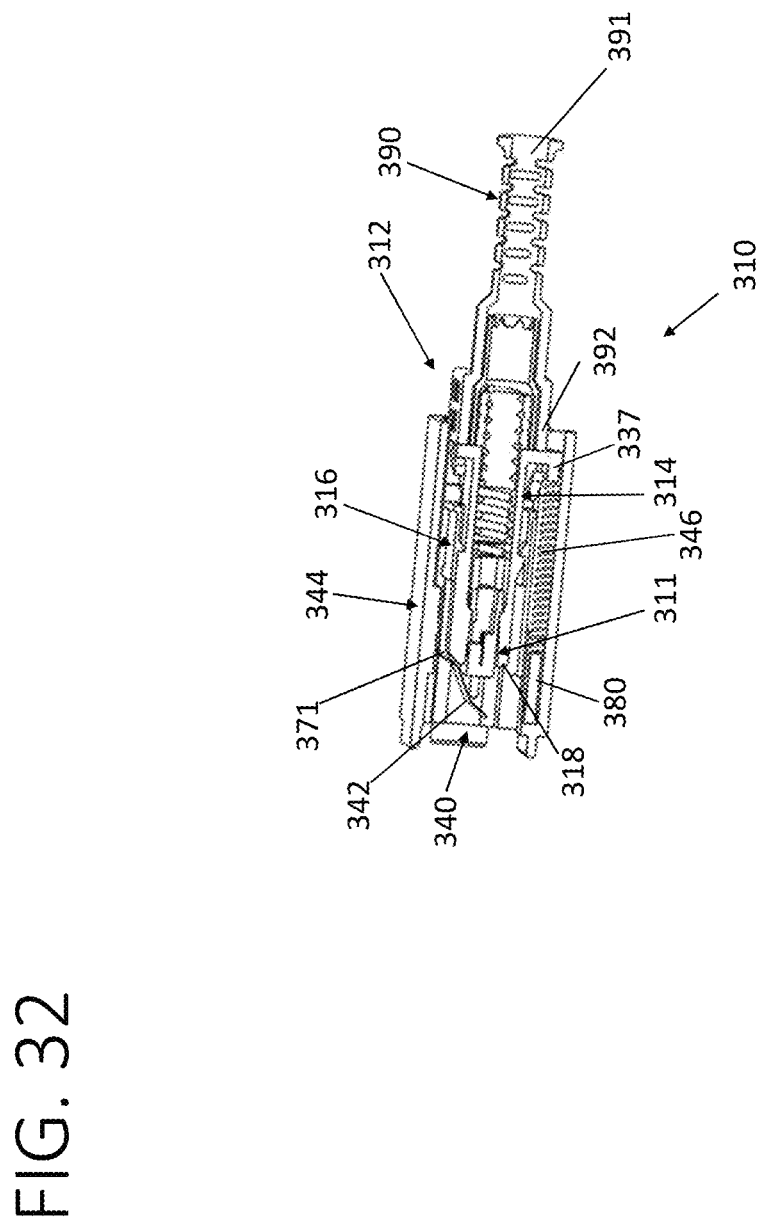
FIG. 32 is a perspective view in vertical section of the connector of FIG. 27.
Figure 33:
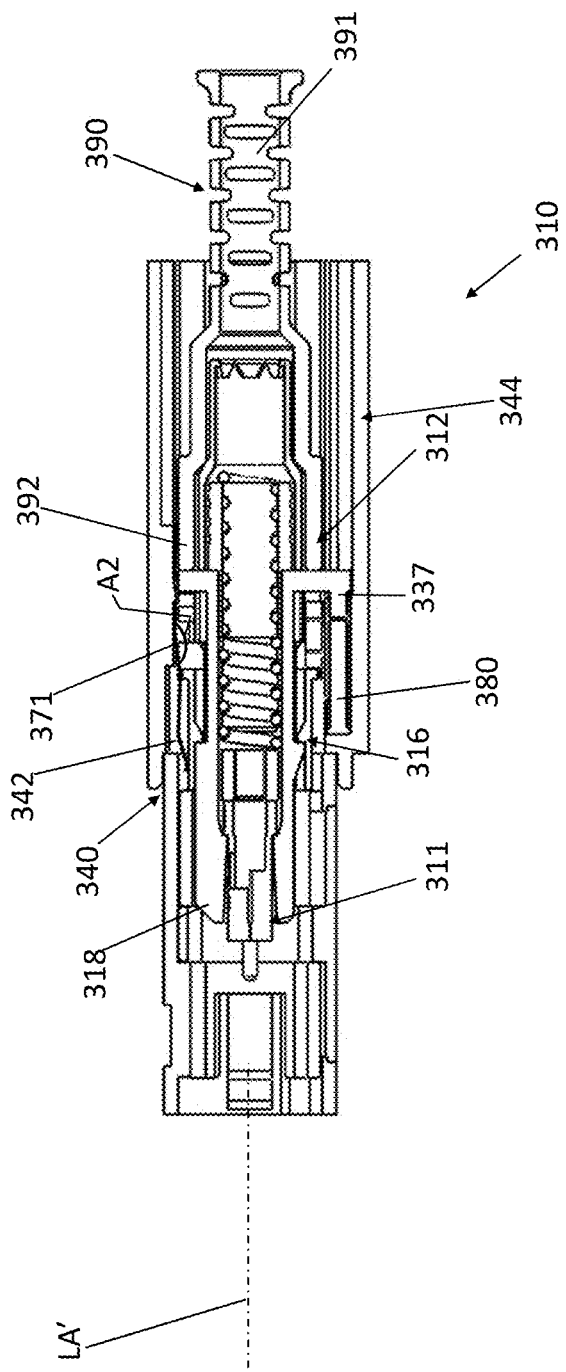
FIG. 33 is a section view of the connector of FIG. 27 inserted into the MPO adapter taken in a vertical plane.
Figure 34:
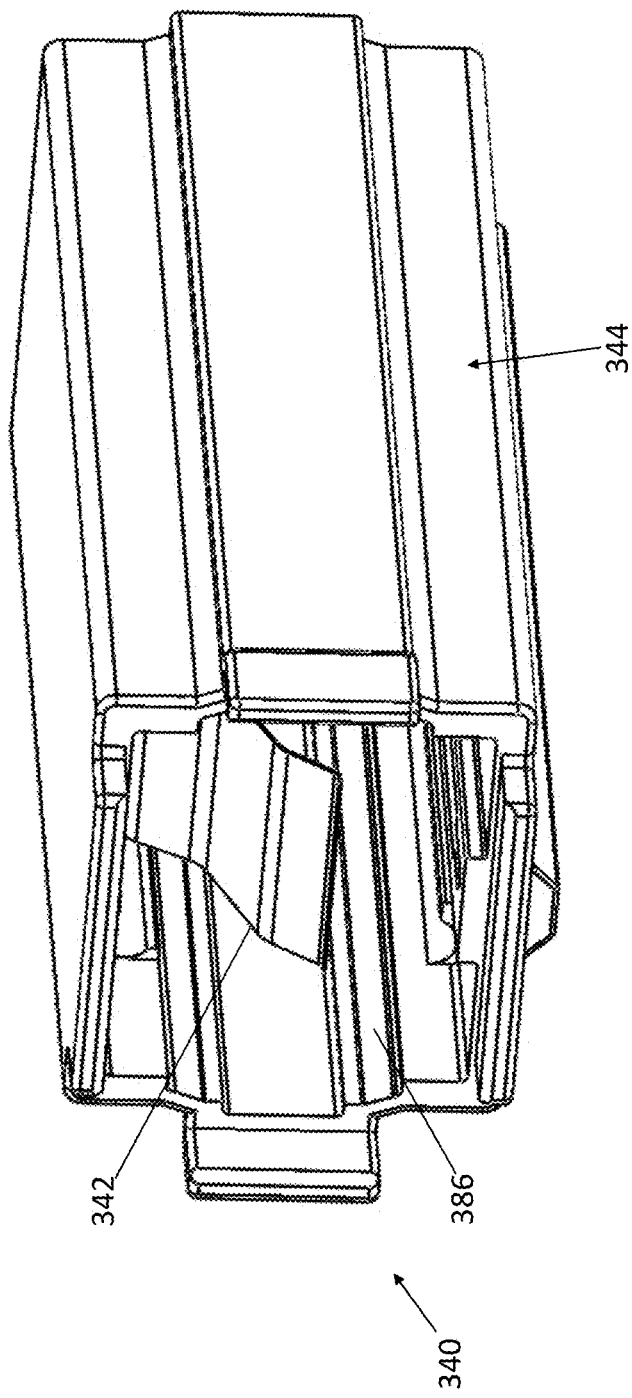
FIG. 34 is a perspective view of a subassembly of the connector of FIG. 27 including a shutter actuator and a shutter plate.

Comparing FIGS. 31 and 32 with FIG. 33, it can be seen that the shutter plate 342 is configured to bend about the living hinge 371 to adjust between the extended and retracted positions. In the extended position shown in FIG. 31, the front portion and the rear portion of the shutter plate 342 define a first interior included angle A1, and in the retracted position shown in FIG. 33, the front portion and the rear portion define a second interior included angle A2 greater than the first interior included angle A1. In the extended position, the front portion of the shutter plate 342 extends downward in front of the ferrule 311 to block the optical signals transmitted therefrom. The shutter plate 342 is configured to flatten by bending about the living hinge 371 as it moves from the extended position to the retracted position. More particularly, the shutter plate 342 flattens so that the front portion moves relative to the rear portion (which is stationary in relation to the actuator housing 344) into the space between the upper portion of the connector housing assembly 312 and the upper wall of the actuator housing 344. After moving to the retracted position, when the shutter actuator 344 advances forward, the shutter plate 342 is configured to resiliently return to the extended position, unflattening so that the front end portion extends downward to be located in front of the ferrule 311.

In general, the actuator housing 344 is configured to be biased toward the front position (FIGS. 27, 30-32, 40) and to engage the mating interface 401 as the connector 310 is plugged into the mating interface such that the actuator housing 344 slides backward along the longitudinal axis in relation to the connector housing assembly 312 and the ferrule 311 to the back position (FIG. 33). The actuator housing 344 is sized and arranged so that the front end of the actuator housing engages an outer perimeter portion of the conventional MPO receptacle 401 as the connector 310 is plugged in. This causes the actuator housing 344 to be displaced rearward in relation to the remainder of the connector 310 as the connector housing assembly 312 and the ferrule 311 move forward into the receptacle 401.

Figure 39:
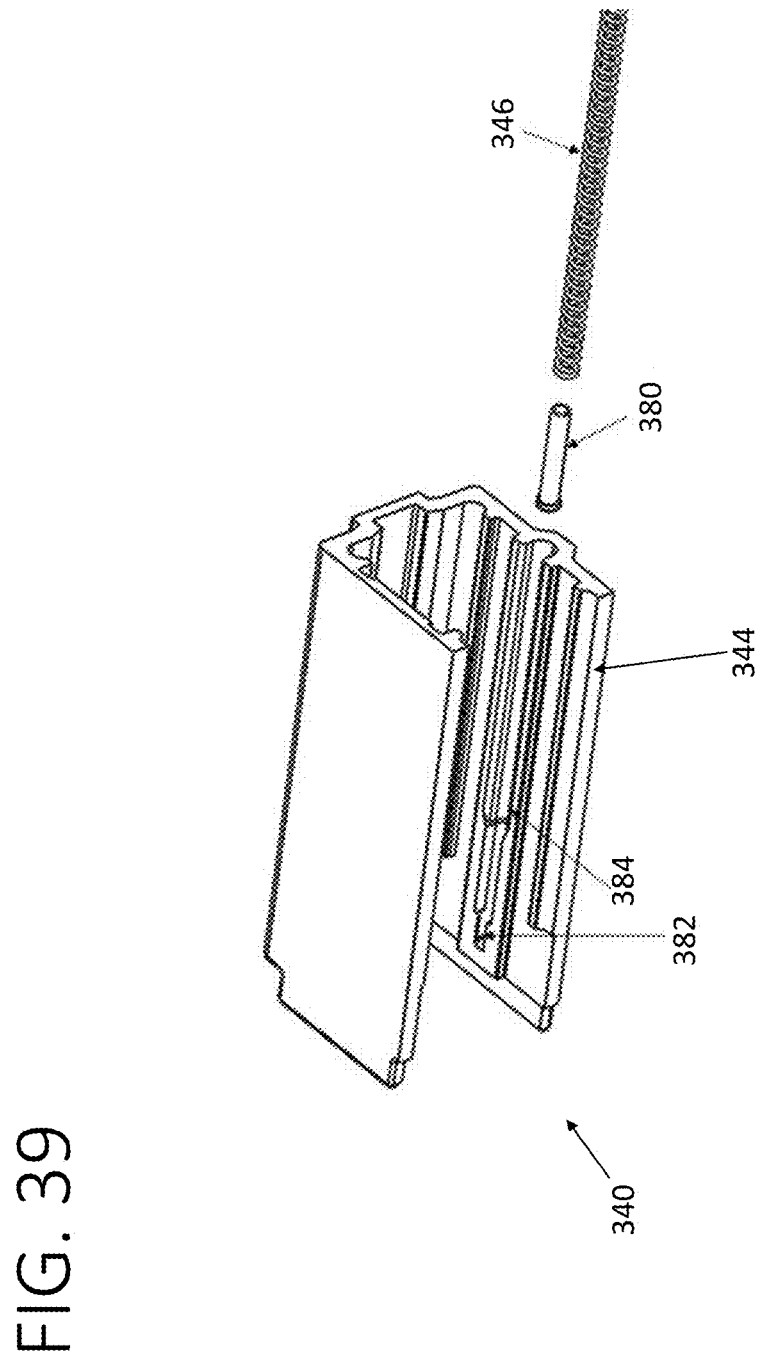
FIG. 39 is an exploded perspective view in vertical section of a subassembly of the connector of FIG. 27 including the shutter actuator, a shutter spring, and a shutter spring holder.
Figure 40:
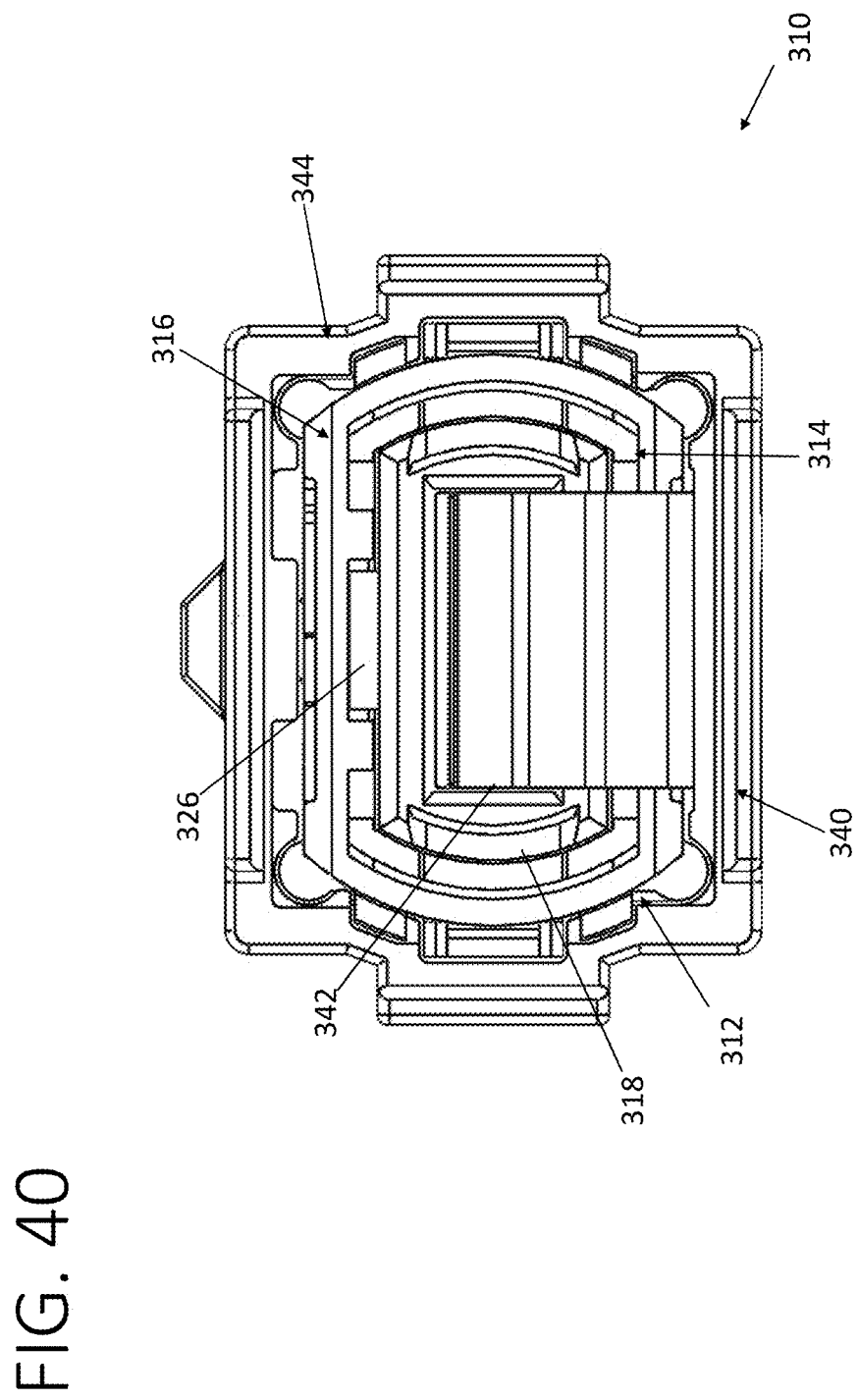
FIG. 40 is a front elevation view of the connector of FIG. 27.
Figure 41:
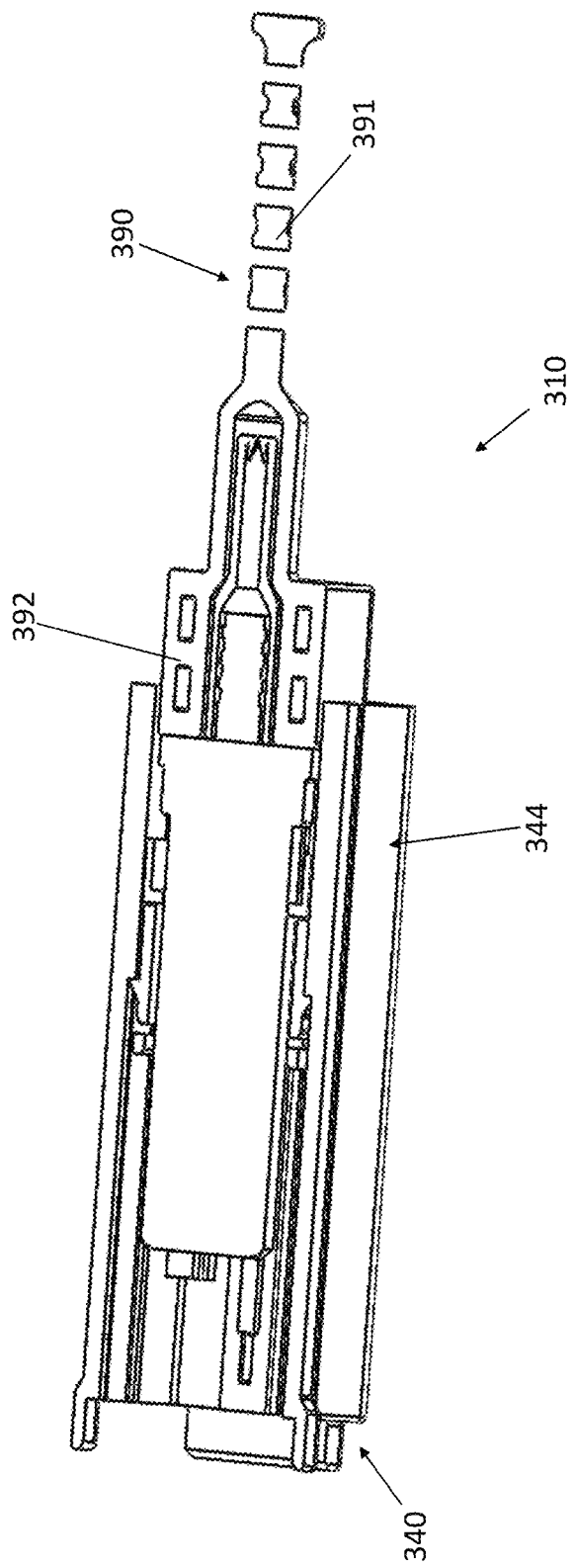
FIG. 41 is a perspective view of the connector of FIG. 27 with parts removed to show internal construction.

Referring to FIG. 39, the lower wall of the actuator housing 344 comprises spring holding features 382, 384 for holding the front section of the ferrule spring 346. More particularly, the lower wall defines a pin holder 382 and a spring cradle 384 rearward of the pin holder. The pin holder 382 is configured to mount a spring holding pin 380 (broadly, a spring holder) on the actuator housing 344. In the final assembled connector 310, the front-most section of the shutter spring 346 is received over the spring holding pin 380, the adjacent section of the shutter spring is received in the cradle 384, and the rear end of the spring engages the spring bracing protrusion 337 on the back flange 336. In the illustrated embodiment, the rear end portion of the spring 346 is received over a forwardly projecting pin portion of the protrusion 337 to center the spring on the protrusion. The spring 346 is compressed between the connector housing assembly 312 and the actuator housing 344 such that the shutter spring yieldably biases the actuator housing forward toward the front position.

Figure 38:
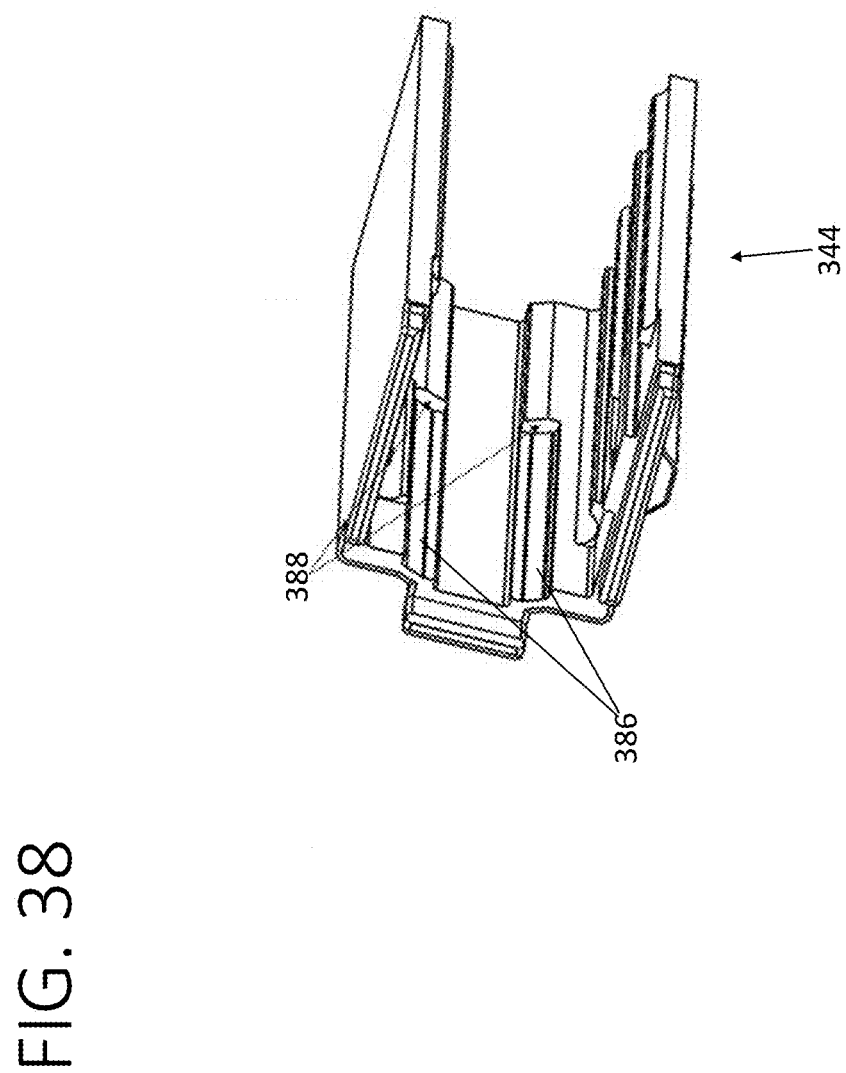
FIG. 38 is a perspective view in vertical section of the shutter actuator of the connector of FIG. 27.

In an exemplary embodiment, the actuator housing 344 and the connector housing assembly 312 comprise mutual guide and stop features configured constrain the actuator housing 344 to move relative to the connector housing along the longitudinal axis LA' and to stop the shutter spring 346 from forcing the actuator housing forward beyond the front position. As explained above, the guide and stop features of the connector housing assembly 312 comprise the latch hooks 395 and rearward facing stop surfaces 396 on the outer sleeve 316. Referring to FIG. 38, the guide and stop features of the illustrated actuator housing 344 comprise longitudinal grooves 386 for slidably receiving each of the latch hooks 395 and a forward facing stop wall 388 at a rear end of each longitudinal groove for engaging the rearward stop surfaces 396 when the actuator housing is in the front position. The latch hooks 395 are slidably received in the grooves 386 and thereby constrain the actuator housing 344 to move relative to the connector housing assembly 312 only along the longitudinal axis LA'. The rearward facing stop surfaces 396 limit the range of motion of the actuator housing 344 in the forward longitudinal direction by engagement with the stop walls 388 when the actuator housing reaches its front position.

During use, the front end portion of the actuator housing 344 is configured to engage the MPO receptacle 401 as the shuttered connector 310 is plugged into the receptacle. During plug-in, the front end portion of the actuator housing 344 initially engages the outer perimeter of the MPO receptacle 401 while the shutter actuator is in the front position. With further advancement of the connector 310 into the receptacle 401, the engagement between the receptacle 401 and the front end portion of the actuator housing 344 displaces the shutter actuator rearward and begins retracting the shutter plate 342 by bending the front portion upward at the living hinge 371. When the connector 310 is mated with the receptacle 401, the receptacle moves the actuator housing 344 to the rear position and fully retracts the shutter plate 342 so that it is flattened in the space between the upper portion of the connector housing assembly 312 and the upper wall of the actuator housing 344, where it is clear of the optical signals being transmitted from the front end of the ferrule 311. The shutter housing 344 covers the outer sleeve 316 of the connector 310, but push-pull boot 390 can still be manipulated to unlatch the connector 310 from the MPO receptacle 401. When the connector 310 is removed from the receptacle 401, the shutter spring 346 resiliently returns the actuator housing 344 to the front position. At the living hinge 371, the shutter plate 342 resiliently rebounds so that the front portion of the shutter plate extends downward in front of the ferrule 111.

Accordingly, it can be seen that the connector 310 provides a retractable shutter 340 that automatically blocks transmission of an optical signal from the ferrule 311 into open space when the connector is unplugged from a mating receptacle 401. Further, the connector 310 can be mated with a conventional MPO receptacle 401, and the shutter 340 automatically retracts to allow optical signal transmission when the connector is plugged into the mating receptacle.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An optical fiber connector configured to plug into a mating interface, the optical fiber connector comprising:
    a ferrule having a front end portion and a rear end portion spaced apart along a longitudinal axis of the optical fiber connector, the ferrule configured for terminating one or more optical fibers such that an optical signal carried by each of the one or more optical fibers is transmitted forward from the front end portion of the ferrule;
    a connector housing for holding the ferrule; and
    a retractable shutter comprising a shutter plate and a shutter actuator, the shutter actuator being slidably connected to the connector housing for movement relative to the connector housing between a front position and a rear position, the shutter actuator being configured to engage the mating interface as the optical fiber connector is plugged into the mating interface whereby the shutter actuator moves relative to the connector housing from the front position to the back position, the shutter plate being connected to the shutter actuator such that the shutter actuator is configured to drive the shutter plate to move between an extended position and a retracted position,
wherein in the extended position, the shutter plate is located to shield the ferrule;
wherein in the retracted position, the shutter plate is located to expose the ferrule; and
wherein the shutter actuator comprises a dovetail protrusion slidably connecting the shutter actuator to the connector housing.

2. The optical fiber connector of claim 1, wherein the shutter plate is resiliently deformable.

3. The optical fiber connector as set forth in claim 2, wherein the shutter plate is configured to flatten as it moves from the extended position to the retracted position.

4. The optical fiber connector as set forth in claim 2, wherein the shutter plate has a front portion, a rear portion, and a length extending along the longitudinal axis from the front portion to the rear portion,
wherein in the extended position, the rear portion of the shutter plate is spaced apart radially outward of the ferrule with respect to the longitudinal axis and the front portion of the shutter plate extends radially inward to a location in front of the ferrule;
wherein in the retracted position the front portion and the rear portion of the shutter plate are both spaced apart radially outward of the ferrule with respect to the longitudinal axis.

5. The optical fiber connector as set forth in claim 1, wherein the ferrule is an MT ferrule.

6. The optical fiber connector as set forth in claim 1, wherein the connector housing comprises a dovetail groove slidably connected to the dovetail protrusion.

7. The optical fiber connector as set forth in claim 1, wherein the retractable shutter comprises a shutter spring to urge the shutter actuator toward the front position.

8. The optical fiber connector as set forth in claim 7, wherein the shutter actuator further comprises a spring holder.

9. The optical fiber connector as set forth in claim 1 wherein the rear portion of the shutter plate comprises first and second leg sections.

10. The optical fiber connector as set forth in claim 9, wherein the first and second leg sections comprise upturned feet and the shutter plate further comprises an upturned lip spaced apart from the upturned feet along the longitudinal axis, the shutter plate configured to receive an actuator body between the upturned feet and the upturned lip.

11. The optical fiber connector of claim 9, wherein the shutter plate is resiliently deformable.

12. The optical fiber connector as set forth in claim 11, wherein the shutter plate is configured to flatten as it moves from the extended position to the retracted position.

13. The optical fiber connector as set forth in claim 11, wherein the shutter plate has a front portion, a rear portion, and a length extending along the longitudinal axis from the front portion to the rear portion,
wherein in the extended position, the rear portion of the shutter plate is spaced apart radially outward of the ferrule with respect to the longitudinal axis and the front portion of the shutter plate extends radially inward to a location in front of the ferrule;
wherein in the retracted position the front portion and the rear portion of the shutter plate are both spaced apart radially outward of the ferrule with respect to the longitudinal axis.

14. The optical fiber connector as set forth in claim 9, wherein the ferrule is an MT ferrule.

15. The optical fiber connector as set forth in claim 9, wherein the retractable shutter comprises a shutter spring to urge the shutter actuator toward the front position.

16. The optical fiber connector as set forth in claim 15, wherein the shutter actuator further comprises a spring holder.

* * * * *